United States Patent
Tung

(10) Patent No.: US 9,612,694 B2
(45) Date of Patent: Apr. 4, 2017

(54) TOUCH PANEL AND METHOD FOR MANUFACTURING THE SAME

(71) Applicant: AU Optronics Corporation, Hsin-Chu (TW)

(72) Inventor: Teng-Fu Tung, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 134 days.

(21) Appl. No.: 14/175,311

(22) Filed: Feb. 7, 2014

(65) Prior Publication Data

US 2015/0009422 A1    Jan. 8, 2015

(30) Foreign Application Priority Data

Jul. 2, 2013 (TW) .............................. 102123670 A

(51) Int. Cl.
     *G06F 3/041*      (2006.01)
     *G06F 3/044*      (2006.01)

(52) U.S. Cl.
     CPC .... *G06F 3/044* (2013.01); *G06F 2203/04103* (2013.01); *Y10T 29/49155* (2015.01)

(58) Field of Classification Search
     CPC .......... G06F 3/044; G06F 2203/04111; G06F 2203/04103; Y10T 29/49155
     USPC ...................................................... 345/174
     See application file for complete search history.

(56) References Cited

U.S. PATENT DOCUMENTS

| | | | | |
|---|---|---|---|---|
| 2003/0090803 | A1* | 5/2003 | Kusuda | G02F 1/133 359/601 |
| 2010/0164881 | A1 | 7/2010 | Kuo et al. | |
| 2012/0169647 | A1 | 7/2012 | Kuo | |
| 2013/0038571 | A1* | 2/2013 | Ho | G06F 3/044 345/174 |
| 2013/0229364 | A1* | 9/2013 | Yu | G06F 3/044 345/173 |

FOREIGN PATENT DOCUMENTS

| | | |
|---|---|---|
| TW | 201113790 | 4/2011 |
| TW | M425339 | 3/2012 |
| TW | 201222370 | 6/2012 |
| TW | I410840 | 10/2013 |

* cited by examiner

*Primary Examiner* — Jonathan Boyd
(74) *Attorney, Agent, or Firm* — WPAT, PC; Justin King; Douglas Hosack

(57) ABSTRACT

A method for manufacturing a touch panel includes forming a light-shielding conductive patterned layer on a transparent substrate, which includes a light-shielding wire, a first contact pad and a first bridging electrode. An insulating layer is formed on the first bridging electrode, the first contact pad and the transparent substrate. First and second openings are formed in the insulating layer to respectively expose a portion of the first bridging electrode and a portion of the first contact pad. A transparent conductive patterned layer is formed, which includes first sensing electrodes, second sensing electrodes, a second bridging electrode and a second contact pad. Each first sensing electrode is connected to the first bridging electrode through the first opening. The second sensing electrodes are connected to each other through the second bridging electrode. The second contact pad is connected to the first contact pad through the second opening.

40 Claims, 23 Drawing Sheets

TOUCH PANEL AND METHOD FOR MANUFACTURING THE SAME

RELATED APPLICATIONS

This application claims priority to Taiwan Application Serial Number 102123670, filed Jul. 2, 2013, which is herein incorporated by reference.

BACKGROUND

Field of Invention

The present invention relates to a touch panel and a method for manufacturing the touch panel.

Description of Related Art

The touch interface enables users to easily input information and activate computer-based functions, such that touch display panels with the touch interface have been seen in diverse applications. The touch display panel can be classified as an out-cell touch display panel and an embedded touch display panel (or namely in-cell touch display panel) depending on the position of the touch panel disposed in the touch display panel. The out-cell touch display panel refers to a display panel with the touch panel external disposed thereto; on the other hand, the embedded touch display panel refers to a touch-sensing array disposed on a thin film transistor array substrate or on a color filter substrate.

Concerning handheld touch sensing products, weight lightening and thinning are the focus issues in the development of the handheld products. One glass solution (OGS) is therefore generated. The OGS represents a touch-sensing array directly being formed on a surface of a protective glass to be a lightweight and thin touch panel. Subsequently, the touch panel and a display panel are assembled to form the out-cell touch display panel.

Generally, six photolithographic masking and etching processes are required in the manufacture of the OGS touch panel. In that each photolithographic masking and etching process costs much, there is a need for an improved method for manufacturing the touch panel to reduce the number of the times of the photolithographic masking and etching processes and thus to decrease manufacturing cost and improve productivity.

SUMMARY

An aspect of the present disclosure provides a method for manufacturing a touch panel, which is manufactured using only three or four photolithographic masking and etching processes.

According to one embodiment of the present disclosure, only three photolithographic masking and etching processes are performed to form a touch panel. The method for manufacturing the touch panel includes the operations below. A transparent substrate is provided, which has a sensing region and a peripheral region surrounding the sensing region. A light-shielding conductive patterned layer is formed on the transparent substrate, which includes: forming at least one light-shielding wire and at least one first contact pad on the peripheral region of the transparent substrate, and the light-shielding wire is connected to the first contact pad; and forming at least one first bridging electrode on the sensing region of the transparent substrate. An insulating layer is formed on a portion of the first bridging electrode, a portion of the first contact pad and a portion of the transparent substrate. At least one first opening and at least one second opening are formed in the insulating layer to respectively expose a portion of the first bridging electrode and a portion of the first contact pad. A transparent conductive patterned layer is formed on the transparent substrate, which includes: forming at least two first sensing electrodes on the sensing region of a portion of the transparent substrate and a portion of the insulating layer; forming at least two second sensing electrodes on the sensing region of a portion of the transparent substrate; forming at least one second bridging electrode on the sensing region of the transparent substrate; and forming at least one second contact pad on the insulating layer on the peripheral region. Each of the first sensing electrodes is connected to the first bridging electrode through the first opening, and the second sensing electrodes are connected to each other through the second bridging electrode, and the second contact pad is connected to the first contact pad through the second opening.

According to another embodiment of the present disclosure, only four photolithographic masking and etching processes are used to form a touch panel. The method for manufacturing the touch panel includes the operations below. A transparent substrate is provided, which has a sensing region and a peripheral region surrounding the sensing region. A light-shielding conductive patterned layer is formed on the peripheral region of the transparent substrate and includes a light-shielding wire and a first contact pad, and the light-shielding wire is connected to the first contact pad. At least one first bridging electrode is formed on the sensing region of the transparent substrate. An insulating layer is formed on a portion of the first bridging electrode, a portion of the first contact pad and a portion of the transparent substrate. First opening and second openings are formed in the insulating layer to respectively expose a portion of the first bridging electrode and a portion of the first contact pad. A transparent conductive patterned layer is formed on the transparent substrate, which includes: forming at least two first sensing electrodes on the sensing region of a portion of the transparent substrate and a portion of the insulating layer; forming at least two second sensing electrodes on the sensing region of a portion of the transparent substrate; forming at least one second bridging electrode on the sensing region of the transparent substrate; and forming at least one second contact pad on the insulating layer on the peripheral region. Each of the first sensing electrodes is connected to the first bridging electrode through the first opening, and the second sensing electrodes are connected to each other through the second bridging electrode, and the second contact pad is connected to the first contact pad through the second opening. A light-shielding patterned layer is formed on the light-shielding conductive patterned layer on the peripheral region.

Another aspect of the present disclosure provides a touch panel. According to one embodiment of the present disclosure, the touch panel includes a transparent substrate, a light-shielding conductive patterned layer, an insulating layer and a transparent conductive patterned layer. The transparent substrate has a sensing region and a peripheral region surrounding the sensing region. The light-shielding conductive patterned layer is disposed on the transparent substrate, in which the light-shielding conductive patterned layer includes at least one light-shielding wire, at least one first contact pad and at least one first bridging electrode. The light-shielding wire and the first contact pad are disposed on the peripheral region of the transparent substrate, and the light-shielding wire is connected to the first contact pad. The first bridging electrode is disposed on the sensing region of the transparent substrate. The insulating layer is disposed on a portion of the first bridging electrode, a portion of the first contact pad and a portion of the transparent substrate, in which the insulating layer has at least one first opening on the first bridging electrode and at least one second opening on the first contact pad. The transparent conductive patterned layer is disposed on the transparent substrate and includes at least two first sensing electrodes, at least two second sensing electrodes, at least one second bridging electrode and at least one second contact pad. Each of the first sensing electrodes is disposed on the sensing region of a portion of the transparent substrate and a portion of the insulating layer. Each of the second sensing electrodes is disposed on the sensing region of a portion of the transparent substrate. The second contact pad is disposed on the insulating layer on the peripheral region. Each of the first sensing electrodes is connected to the first bridging electrode through the first opening, and the second sensing electrodes are connected to each other through the second bridging electrode, and the second contact pad is connected to the first contact pad through the second opening.

According to another embodiment of the present disclosure, the touch panel includes a transparent substrate, a light-shielding conductive patterned layer, at least one first bridging electrode, an insulating layer, a transparent conductive patterned layer, at least two second sensing electrodes, at least one second bridging electrode, at least one second contact pad and a light-shielding patterned layer. The transparent substrate has a sensing region and a peripheral region surrounding the sensing region. The light-shielding conductive patterned layer is disposed on the peripheral region of the transparent substrate and includes a light-shielding wire and a first contact pad, and the light-shielding wire is connected to the first contact pad. The first bridging electrode is disposed on the sensing region of the transparent substrate. The insulating layer is disposed on a portion of the first bridging electrode, a portion of the first contact pad and a portion of the transparent substrate, in which the insulating layer has a first opening on the first bridging electrode and a second opening on the first contact pad. The transparent conductive patterned layer is disposed on the transparent substrate and includes at least two first sensing electrodes, and each of the first sensing electrodes is disposed on the sensing region of a portion of the transparent substrate and a portion of the insulating layer. Each of the second sensing electrodes is disposed on the sensing region of a portion of the transparent substrate. The second contact pad is disposed on the insulating layer on the peripheral region. Each of the first sensing electrodes is connected to the first bridging electrode through the first opening, and the second sensing electrodes are connected to each other through the second bridging electrode, and the second contact pad is connected to the first contact pad through the second opening. The light-shielding patterned layer is disposed on the light-shielding conductive patterned layer on the peripheral region.

BRIEF DESCRIPTION OF THE DRAWINGS

The invention can be more fully understood by reading the following detailed description of the embodiment, with reference made to the accompanying drawings as follows.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations.

The terminology used herein is for the purpose of describing particular embodiments only and is not intended to be limiting of the invention. As used herein, the singular forms "a", "an" and "the" are intended to include the plural forms as well, unless the context clearly indicates otherwise.

First Embodiment

Figure 1A:
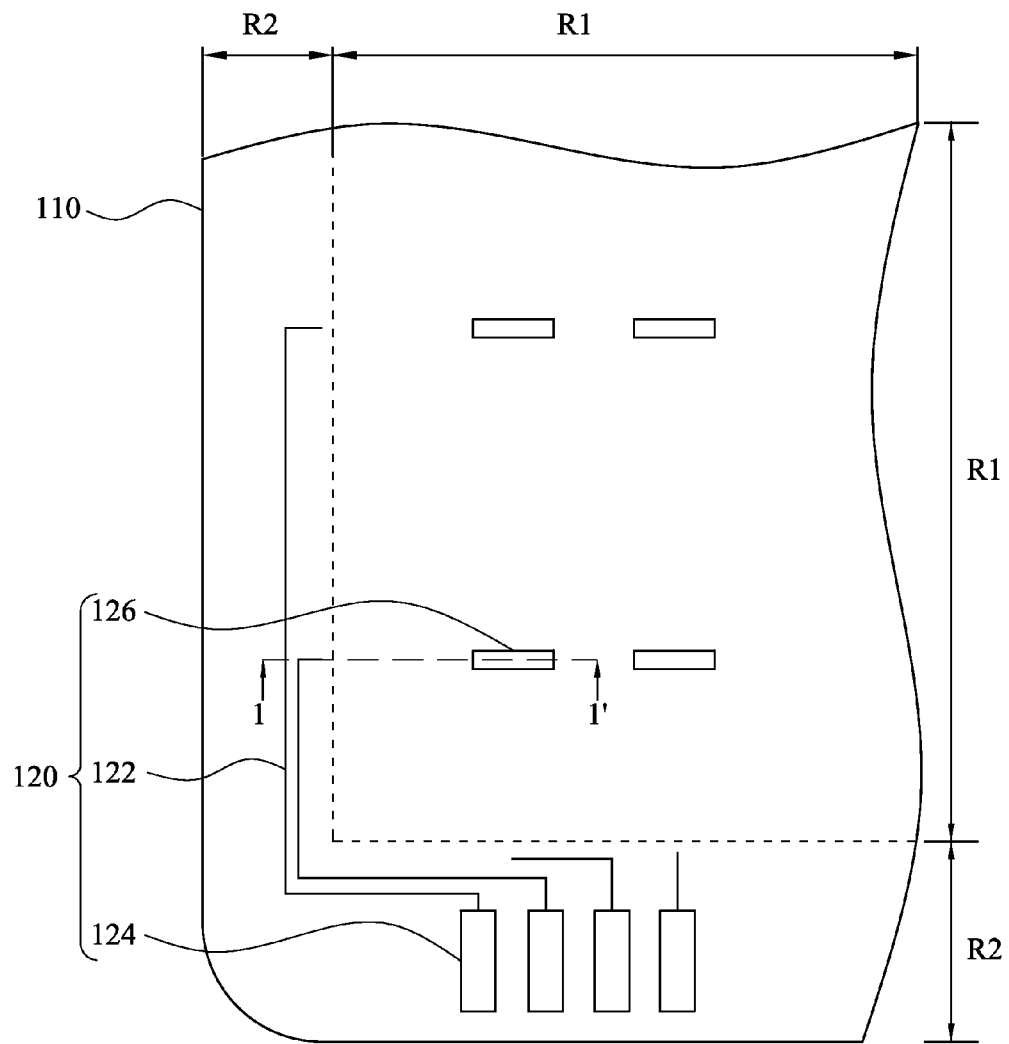
FIGS. 1A-1D, 2A-2C and 3A-3C are top and cross-sectional views at various stages of manufacturing a touch panel according to a first embodiment of the present disclosure.
Figure 1B:
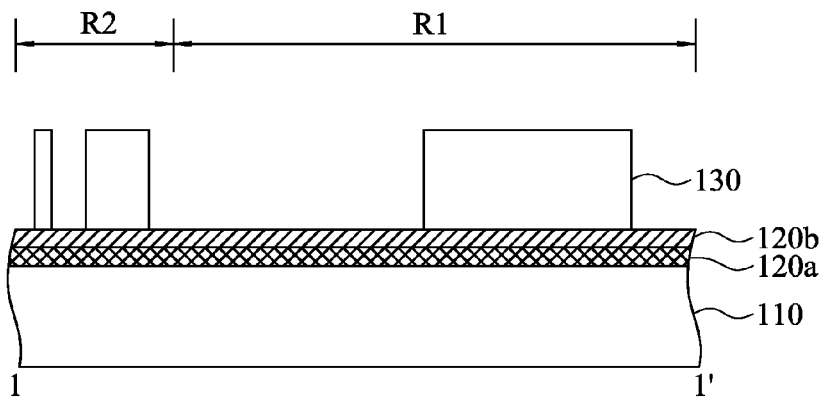
Figure 1C:
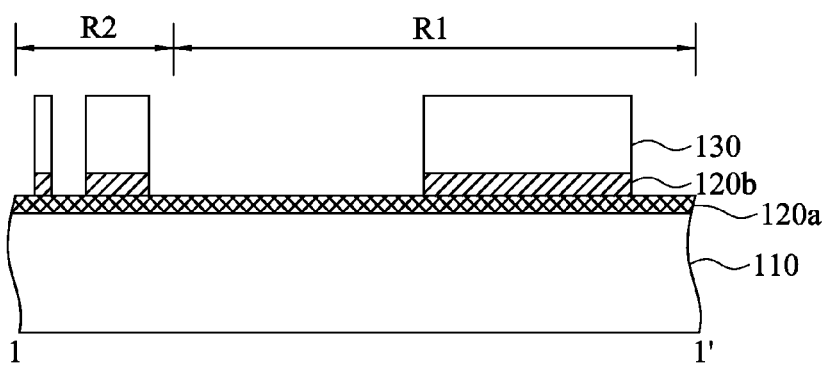
Figure 1D:
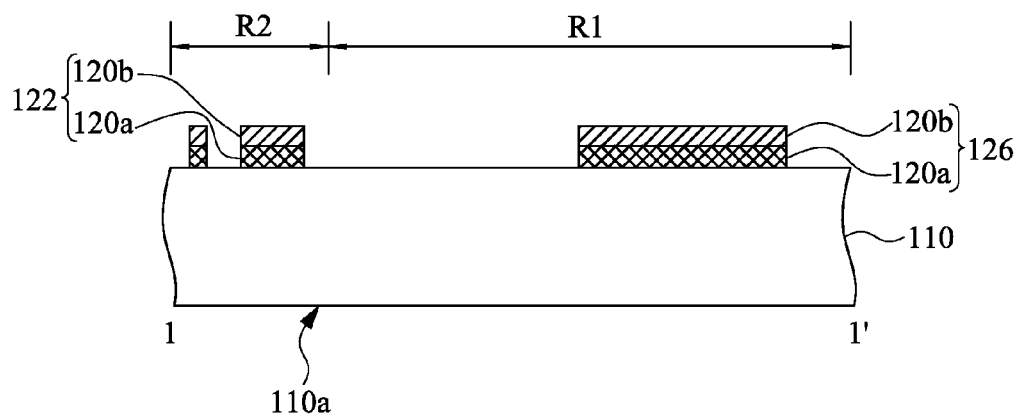

As shown in FIG. 1A, a transparent substrate 110 is provided, which includes a sensing region R1 and a peripheral region R2 disposed at the periphery of the sensing region R1; that is, the peripheral region R2 surrounds the sensing region R1. The transparent substrate 110 may be made of glass, quartz, transparent polymer materials or other suitable materials. Subsequently, a light-shielding conductive layer (not shown) is formed on the transparent substrate 110 and in direct contact with an upper surface of the transparent substrate 110, and then patterned by suitable manufacturing methods so as to form a light-shielding conductive patterned layer 120 on the transparent substrate 110. The light-shielding conductive patterned layer 120 includes a light-shielding wire 122, a first contact pad 124 and a first bridging electrode 126. FIGS. 1B-1D are cross-sectional views at various stages of manufacturing the light-shielding conductive patterned layer 120, which are along line 1-1' of FIG. 1A. First, as shown in FIG. 1B, a light-shielding material layer 120a and a conductive material layer 120b are sequentially formed to blanket cover the transparent substrate 110, and a patterned photoresist layer 130 is then formed on the conductive material layer 120b. A portion of the conductive material layer 120b is exposed from the patterned photoresist layer 130. Next, a portion of the conductive material layer 120b, which is not covered by the patterned photoresist layer 130, is removed to expose a portion of the light-shielding material layer 120a, as shown in FIG. 10. Finally, the exposed portion of the light-shielding material layer 120a is removed, and the patterned photoresist layer 130 is then removed to form the light-shielding wire 122 and the first bridging electrode 126, as shown in FIG. 1D. Accordingly, each of the light-shielding wires 122 and each of the first bridging electrodes 126 include both the light-shielding material layer 120a and the conductive material layer 120b disposed thereon. In addition, as shown in FIG. 1A, the light-shielding wire 122 is electrically connected to the first contact pad 124, and the light-shielding wire 122 and the first contact pad 124 are formed on the peripheral R2 of the transparent substrate 110, and the first bridging electrode 126 is formed on the sensing region R1 of the transparent substrate 110. It is noteworthy that the first bridging electrode 126 on the sensing region R1 of the transparent substrate 110 and the light-shielding wire 122 and the first contact pad 124 on the peripheral region R2 of the transparent substrate 110 may be formed by a same photolithographic and etching processes, such that it does not need two photolithographic masking and etching processes to respectively form the first bridging electrode 126, the light-shielding wire 122 and the first contact pad 124. Moreover, an arrangement of the light-shielding wires 122 is illustrated in FIG. 1A, but the layout of the light-shielding wires 122 may be appropriately altered in practical applications.

The light-shielding material layer 120a may be a black photoresist material for effectively shielding light. As shown in FIG. 1D, the light-shielding wires 122 appear in black when those are observed from a lower surface 110a of the transparent substrate 110. In another aspect, the conductive material layer 120b may include metal to let the light-shielding wire 122, the first contact pad 124 and the first bridging electrode 126 become conductive. The metal may be molybdenum (Mo), chromium (Cr), aluminum (Al), neodymium (Nd), titanium (Ti), copper (Cu), silver (Ag), gold (Au), zinc (Zn), indium (In), gallium (Ga), niobium (Nb), tantalum (Ta) or a combination thereof.

For example, the light-shielding material layer 120a is a negative photoresist, and the conductive material layer 120b includes metal. As shown in FIGS. 1C and 1D, after the exposed portion of the conductive material layer 120b is removed, the exposed portion of the light-shielding material layer 120a and the patterned photoresist layer 130 may be removed by a stripping solution. Finally, an exposure process is performed to let the negative photoresist material of the light-shielding material layer 120a of FIG. 1D cross-link and cure.

For another example, the light-shielding material layer 120a is a positive photoreisist, and the conductive material layer 120b includes metal. As such, as shown in FIG. 1C, after the exposed portion of the conductive material layer 120b is removed, an exposure process is required to let the positive photoresist material of the exposed portion of light-shielding material layer 120a decompose and thus easily dissolve in the stripping solution. Subsequently, the light-shielding material layer 120a processed by the exposure process and the patterned photoresist layer 130 may be removed by the stripping solution so as to form the structure of FIG. 1D.

Figure 2A:
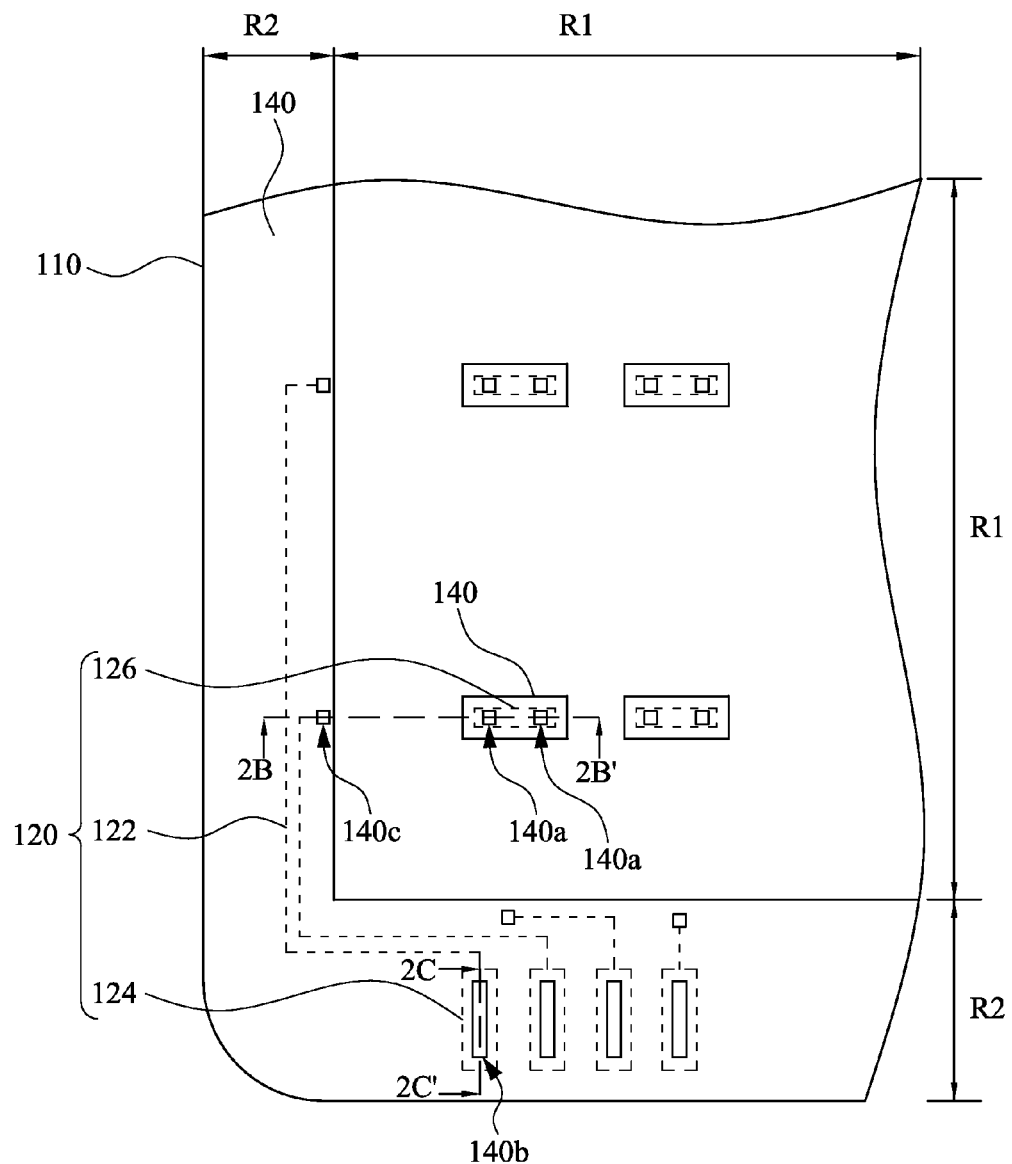

Next, an insulating layer 140 is formed on a portion of the first bridging electrode 126, the first contact pad 124 and the transparent substrate 110, as shown in FIG. 2A. Further, the insulating layer 140 further covers the peripheral region R2 of the transparent substrate 110 to protect the light-shielding wire 122 beneath the insulating layer 140. The insulating layer 140 may be made of organic or inorganic materials. The organic material may be polyimide or other suitable polymers. The inorganic material may be silicon oxide, silicon nitride, silicon oxynitride or other suitable inorganic materials. For a specific example, the insulating layer 140 may be a black resin (e.g., a black matrix) and formed on the portion of the first bridging electrode 126, the first contact pad 124 and the peripheral region R2 of the transparent substrate 110, as shown in FIG. 2A. Accordingly, light leakage is more difficult to occur due to the presence of the black insulating layer 140 and the light-shielding wire 122. In practical applications, the distribution of the insulating layer 140 may be appropriately changed and not limited to those exemplified in FIG. 2A. Subsequently, at least one first opening 140a and at least one second opening 140b are formed in the insulating layer 140, as shown in FIG. 2A. The first opening 140a and the second opening 140b are configured to respectively expose a portion of the first bridging electrode 126 and a portion of the first contact pad 124.

Figure 2B:
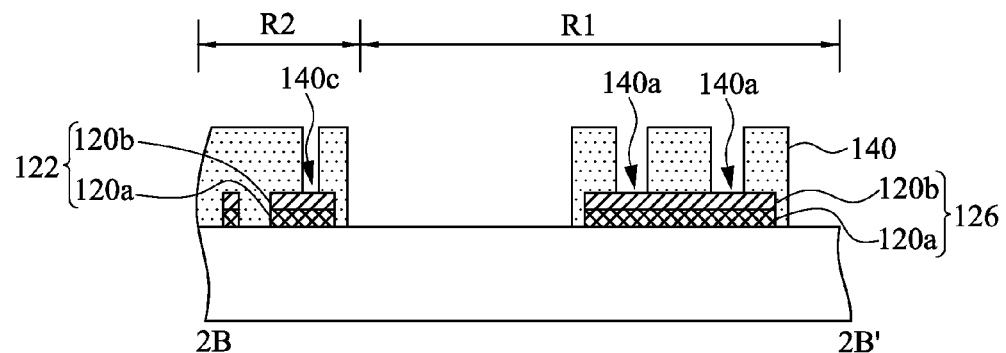
Figure 2C:
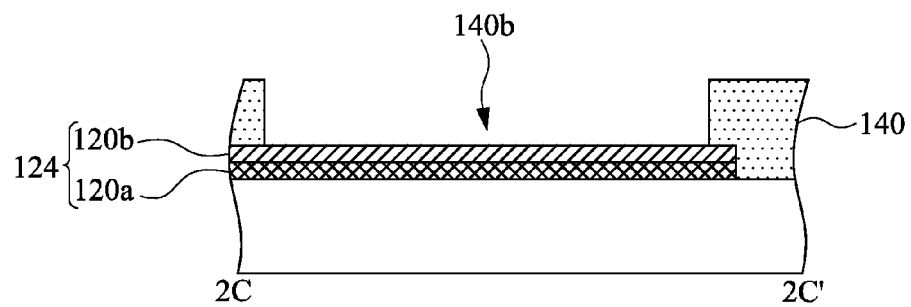
Figure 2D:
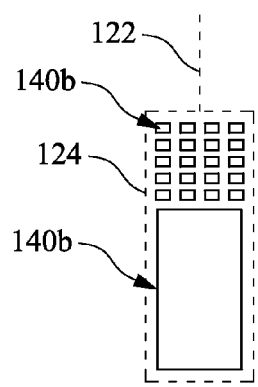
FIG. 2D is a top view of a second opening according to an example of the present disclosure.

FIG. 2B is a cross-sectional view along line 2B-2B' of FIG. 2A. As shown in FIGS. 2A-2B, there are two first openings 140a disposed on each first bridging electrode 126. In addition, a contact hole 140c may be formed in the insulating layer 140 to expose a portion of the light-shielding wire 122. The first bridging electrode 126 and the light-shielding wire 122 may be electrically connected to other elements respectively through the first opening 140a and the contact hole 140c. Referring to FIG. 2A, the second opening 140b is disposed on each first contact pad 124. FIG. 2C is a cross-sectional view along line 2C-2C' of FIG. 2A. As shown in FIG. 2C, the first contact pad 124 includes the light-shielding material layer 120a and the conductive material layer 120b disposed thereon. The first contact pad 124 may be electrically connected to other elements through the second opening 140b. However, the amount of the second opening 140b is not limited herein. In another example, there are a plurality of second opening 140b regularly arranged, for example, arranged in a form of a matrix, as shown in FIG. 2D. As such, a contact area between the second openings 140b and other elements may be increased. The elements may be a contact pad of a flexible printed circuit board. In other embodiment, the second openings 140b are irregularly arranged, for example, randomly arranged, and at least one of the shapes of the first opening 140a, the second opening 140b and the contact hole 140c may be any suitable shaped, for example, square shaped, circle shaped, ellipse shaped, triangle shaped, rectangle shaped, diamond shaped, pentagon shaped, honeycomb shaped, curve shaped, half-moon shaped, or other suitable polygon shaped.

Figure 3A:
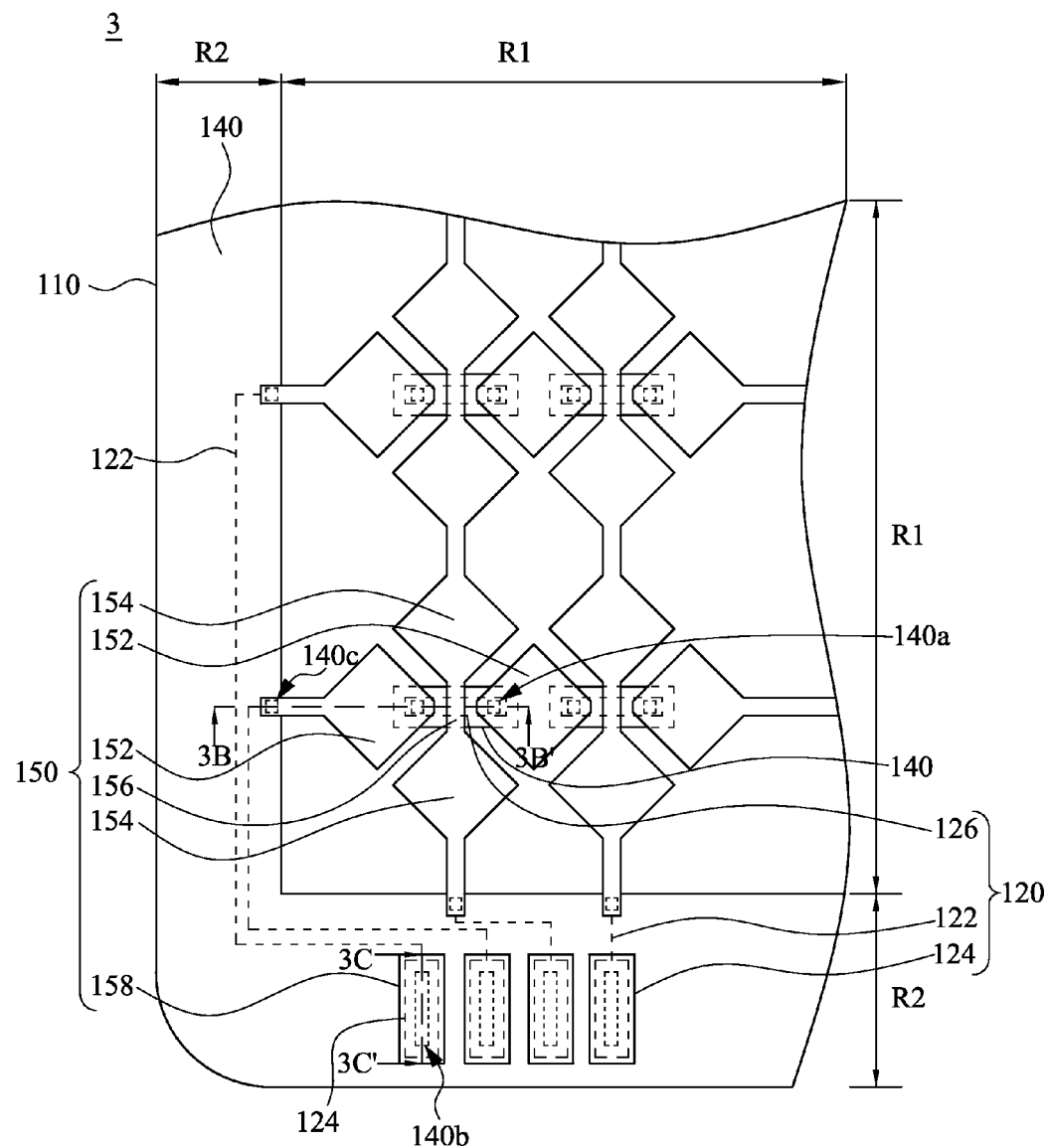
Figure 3B:
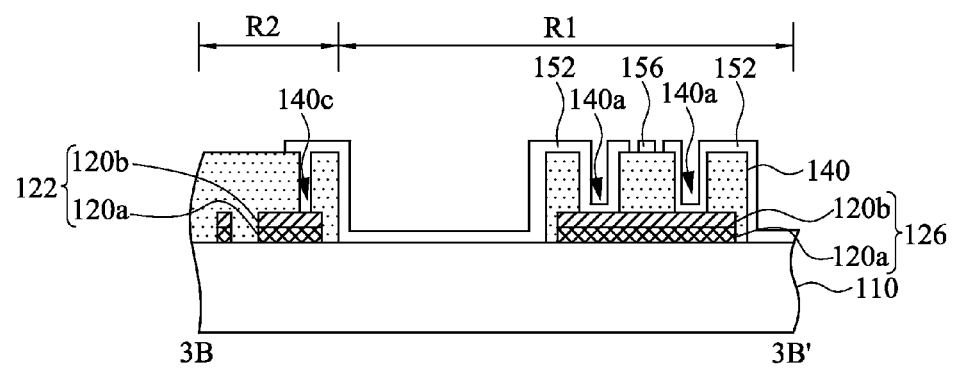

Next, a transparent conductive patterned layer 150 is formed on the transparent substrate 110, as shown in FIG. 3A. The transparent conductive patterned layer 150 includes at least two first sensing electrodes 152, at least two second sensing electrodes 154, at least one second bridging electrode 156 and at least one second contact pad 158. Referring to FIG. 3A, the first sensing electrodes 152 are formed on the sensing region R1 of a portion of the transparent substrate 110 and a portion of the insulating layer 140. The first bridging electrode 126 is connected to two adjacent first sensing electrodes 152 through two first openings 140a. FIG. 3B is a cross-sectional view along line 3B-3B' of FIG. 3A. As shown in FIG. 3B, each of the first sensing electrodes 152 is connected to the first bridging electrode 126 through the first opening 140a. In addition, the first sensing electrode 152 may be connected to a portion of the light-shielding wire 122 through the contact hole 140c to let the signal of the first sensing electrodes 152 transmit to the light-shielding wire 122. Moreover, the second sensing electrode 154 may be connected to another of the light-shielding wire 122 through the contact hole 140c to let the signal of the second sensing electrodes 154 transmit to the light-shielding wire 122.

Figure 3C:
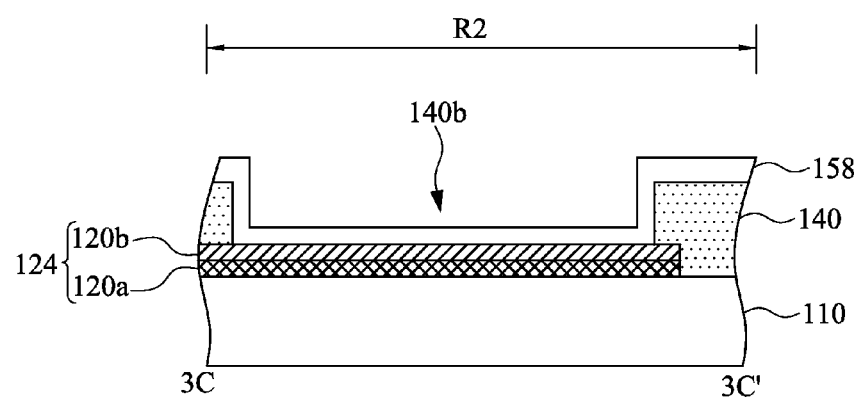

Returning to FIG. 3A, the second sensing electrodes 154 are formed on the sensing region R1 of a portion of the transparent substrate 110. The first sensing electrodes 152 and the second sensing electrodes 154 are misplaced (or namely staggered arrangement, or namely alternately arrangement, or namely displacement arrangement) and not overlapped or not in contact with each other. The second bridging electrode 156 is formed on the sensing region R1 of the transparent substrate 110. The second sensing electrodes 154 are connected to each other through the second bridging electrode 156. Specifically, two adjacent second sensing electrodes 154 are connected to each other through the second bridging electrode 156. Moreover, as shown in FIGS. 3A-3B, the second bridging electrode 156 interlaces the first bridging electrode 126 and the second bridging electrode 156 may be disposed on the first bridging electrode 126. Referring to FIG. 3A, the second contact pad 158 is formed on the insulating layer 140 on the peripheral region R2. Specifically, the second contact pad 158 is formed on the first contact pad 124. The second contact pad 158 is connected to the first contact pad 124 through the second opening 140b. FIG. 3C is a cross-sectional view along line 3C-3C' of FIG. 3A. As shown in FIG. 3C, the second contact pad 158 is formed in the second opening 140b and covers partial of the insulating layer 140.

As mentioned above, it requires only three photolithographic masking and etching processes to form the touch panel 3 of FIG. 3A according to the first embodiment of the present disclosure. As shown in FIG. 1A, the light-shielding conductive patterned layer 120 is formed through the first photolithographic masking and etching processes. The light-shielding conductive patterned layer 120 includes the light-shielding wire 122, the first contact pad 124 and the first bridging electrode 126. The insulating layer 140 having the first opening 140a and the second opening 140b is formed through the second photolithographic masking and etching processes, as shown in FIG. 2A. The transparent conductive patterned layer 150 is formed through the third photolithographic masking and etching processes, as shown in FIG. 3A. Since it requires only three photolithographic masking and etching processes to form the touch panel 3, cost of the manufacturing method is low, which is conductive to increase production efficiency.

Second Embodiment

Figure 4A:
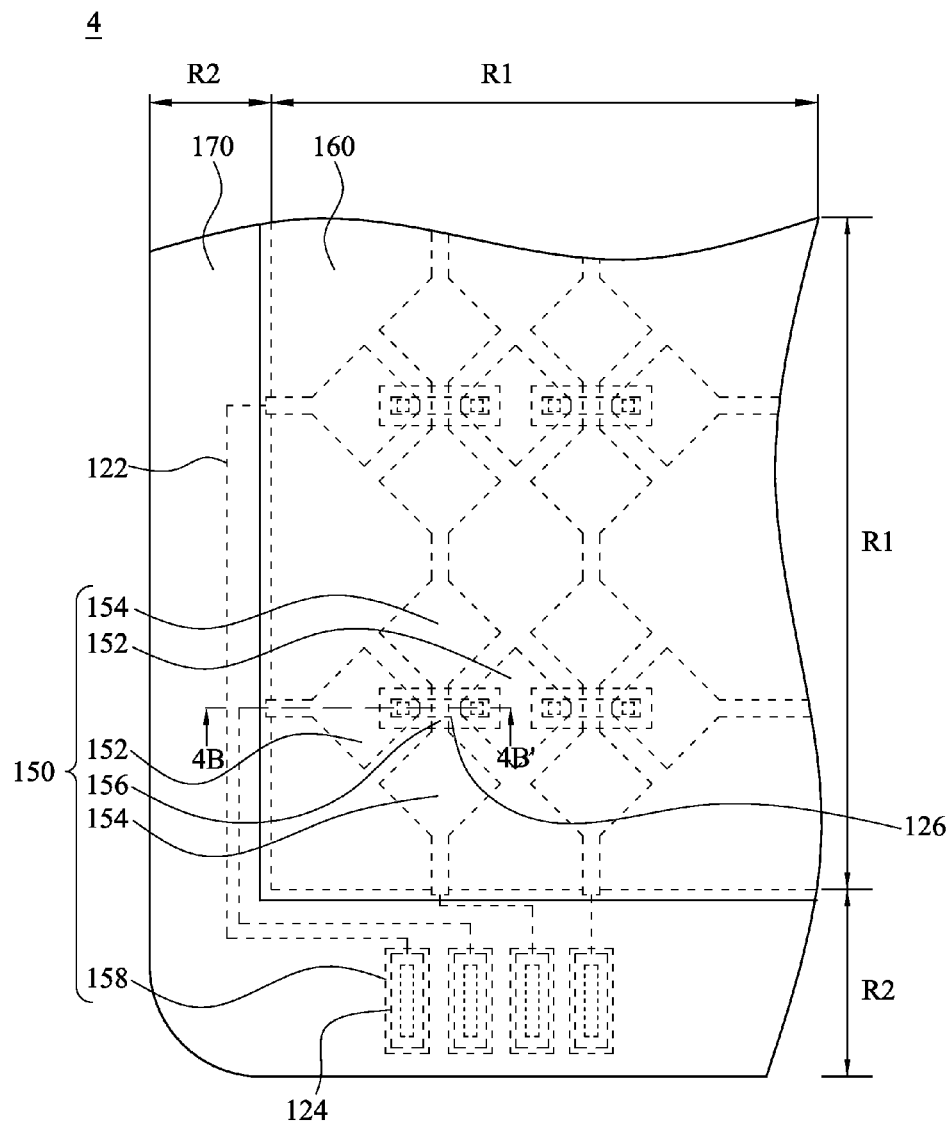
FIGS. 4A-4B are top and cross-sectional views of a touch panel according to a second embodiment of the present disclosure.
Figure 4B:
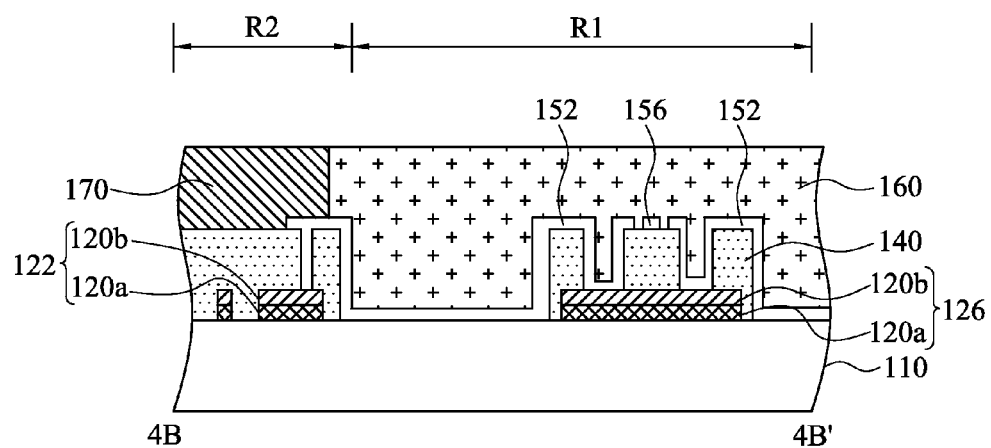

FIG. 4A is a top view of a touch panel 4 according to the second embodiment of the present disclosure. FIG. 4B is a cross-sectional view along line 4B-4B' of FIG. 4A. The difference between the embodiment and the first embodiment is that the protective layer 160 and a light-shielding patterned layer 170 are formed to respectively cover the sensing region R1 and the peripheral region R2 of the transparent substrate 110 of the touch panel 3 of FIG. 3A, and thus to form the structure of the touch panel 4 according to the embodiment.

As shown in FIGS. 4A-4B, the protective layer 160 covers the transparent conductive patterned layer 150 on the sensing region R1. Specifically, the protective layer 160 covers the first sensing electrode 152, the second sensing electrode 154 and the second bridging electrode 156. The protective layer 160 may be an anti-splinted film (ASF) or made of organic or inorganic materials. The organic material may be a general material used for fabricating an overcoat layer, such as polyimide (PI), polycarbonate (PC), polyethylene terephthalate, polyethylene naphthalate esters, polypropylene (PP), polyethylene (PE), polystyrene (PS), derivatives of those polymers or other suitable materials. The inorganic material may be silicon oxide ($SiO_x$), silicon nitride ($SiN_y$), silicon oxynitride ($SiO_xN_y$) or other suitable materials. The ASF may be directly adhered on the transparent conductive patterned layer 150 to prevent burst from external force, but the present disclosure is not limited thereto.

Referring to FIG. 4A, the light-shielding patterned layer 170 only covers the first contact pad 124, the second contact pad 158 and the light-shielding wire 122 on the peripheral region R2. The light-shielding patterned layer 170 may be made of a colored resin. The light-shielding patterned layer 170 may be formed on the peripheral region R2 of the transparent substrate 110 by spraying, adhering, screen-printing or ink or photoresist coating to beautify the appearance of the touch panel 4. In other embodiments, the light-shielding patterned layer 170 may include a black resin, which has a function of light shielding. In the embodiment variation, the light-shielding patterned layer 170 may be formed on the display panel (not shown). It is noteworthy that, in the second embodiment, there is no need for any photolithographic masking and etching processes to form the protective layer 160 and the light-shielding patterned layer 170, such that the production efficiency may be increased. For a specific example, the insulating layer 140 may be a black resin (e.g., a black matrix) and formed on the portion of the first bridging electrode 126, the first contact pad 124 and the peripheral region R2 of the transparent substrate 110, as shown in FIG. 2A. Accordingly, light leakage is more difficult to occur due to the presence of the black insulating layer 140 and the light-shielding wire 122.

Third Embodiment

Figure 5:
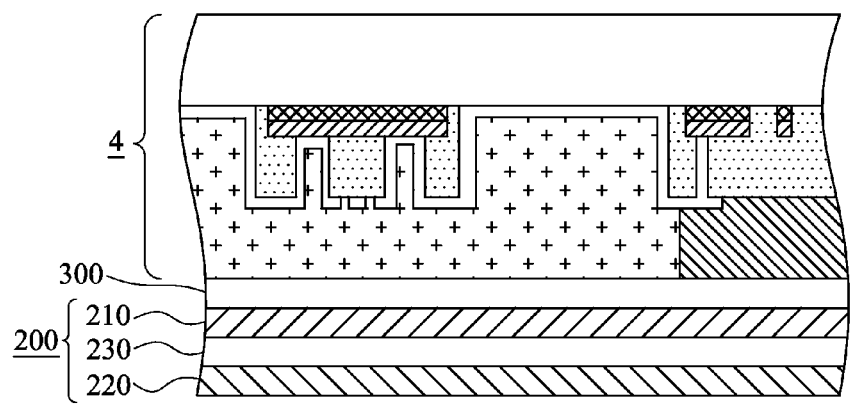
FIG. 5 is a cross-sectional view of a touch display panel according to a third embodiment of the present disclosure.

FIG. 5 is a cross-sectional view of a touch display panel 5 according to the third embodiment of the present disclosure. In the embodiment, an adhesive layer 300 is used to adhere the touch panel 4 of FIG. 4A on an outside surface of substrate 210 or 220 of display panel 200, and thus to form the touch display panel 5. The display panel 200 includes a first substrate 210, a second substrate 220 and a display medium layer 230.

For example, the first substrate 210 is a color filter substrate, and the second substrate 220 is a thin film transistor substrate, but the present disclosure is not limited thereto. If the second substrate 220 is a color filter on array (COA) substrate or an array on color filter (AOC) substrate, the first substrate 210 may be replaced by a substrate without color filters. If the first substrate 210 is a thin film transistor substrate, and the second substrate 220 is a color filter substrate or the first substrate 210 is a color filter on array (COA) substrate or an array on color filter (AOC) substrate, the second substrate 220 may be replaced by a substrate without color filters.

The display medium layer 230 may be made of a non-self-luminous material or a self-luminous material. The non-self-luminous material may be liquid crystal or an electrophoresis material. The self-luminous material may be an organic or inorganic light-emitting material. In other words, the display panel 200 may be a liquid crystal display (LCD) panel, an organic light emitting display panel or an electrophoretic display panel.

Fourth Embodiment

Figure 6A:
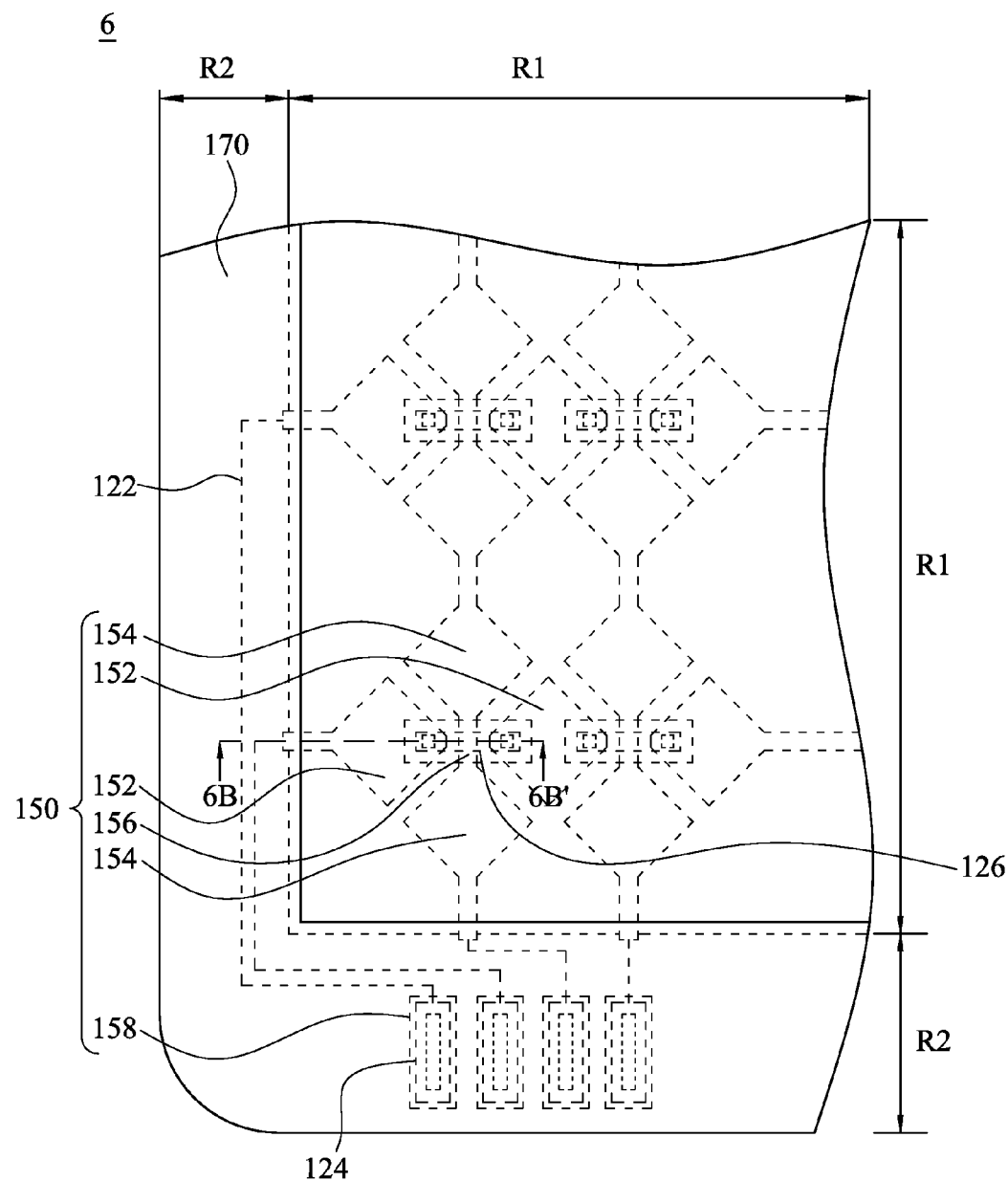
FIGS. 6A-6B are top and cross-sectional views of a touch panel according to a fourth embodiment of the present disclosure.
Figure 6B:
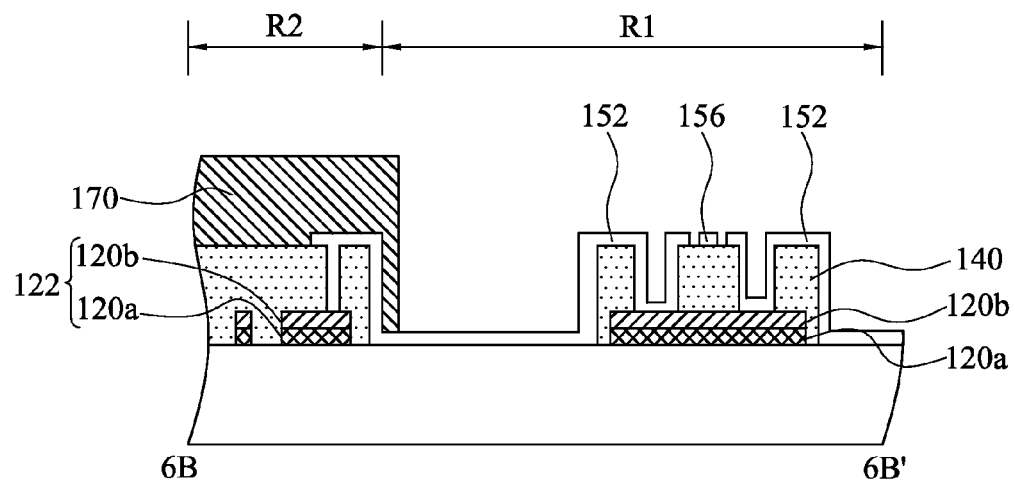

FIG. 6A is a top view of a touch panel 6 according to the fourth embodiment of the present disclosure. FIG. 6B is a cross-sectional view along line 6B-6B' of FIG. 6A. The difference between the embodiment and the first embodiment is that a light-shielding patterned layer 170 is formed on the peripheral region R2 and a portion of the sensing region R1 of the transparent substrate 110 of the touch panel 3 of FIG. 3A, and thus to form a structure of the touch panel 6 according to the embodiment. The light-shielding patterned layer 170 of the touch panel 6 further extends and covers the portion of the sensing region R1 of the transparent substrate 110, as shown in FIGS. 6A-6B. Other portion of the sensing region R1 is exposed from the light shielding patterned layer 170. For a specific example, the insulating layer 140 may be a black resin (e.g., a black matrix) and formed on the portion of the first bridging electrode 126, the first contact pad 124 and the peripheral region R2 of the transparent substrate 110, as shown in FIG. 2A. Accordingly, light leakage is more difficult to occur due to the presence of the black insulating layer 140 and the light-shielding wire 122.

Fifth Embodiment

Figure 7:
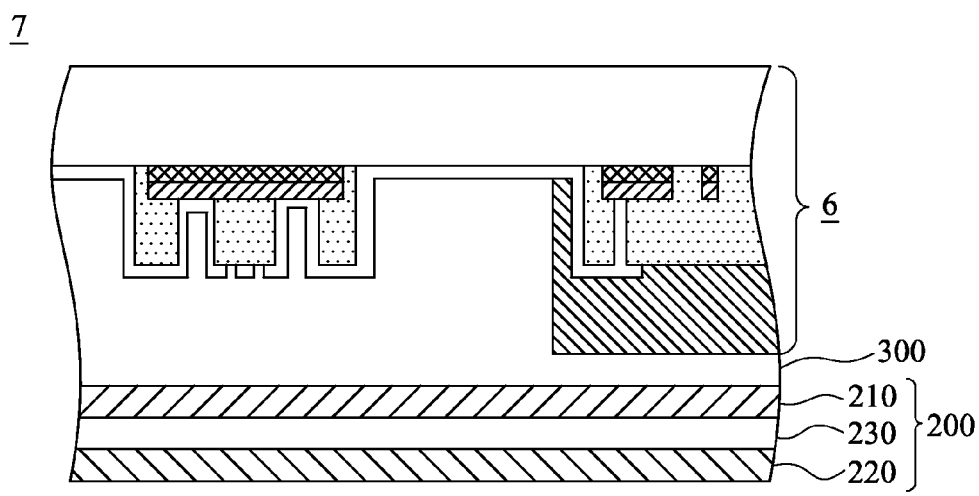
FIG. 7 is a cross-sectional view of a touch display panel according to a fifth embodiment of the present disclosure.

FIG. 7 is a cross-sectional view of a touch display panel 7 according to the fifth embodiment of the present disclosure. In the embodiment, an adhesive layer 300 is used to adhere the touch panel 6 of FIG. 6A on a display panel 200, and thus to form the touch display panel 7. The adhesive layer 300 may be an optical clear adhesive (OCA). In the fifth embodiment, there is no need for a protective layer since the OCA has functions of adhesion and protection. The display panel 200 includes a first substrate 210, a second substrate 220 and a display medium layer 230. The features of the display panel 200 may be the same as those of the display panel 200 of the third embodiment and thus are omitted herein.

Sixth Embodiment

Figure 8A:
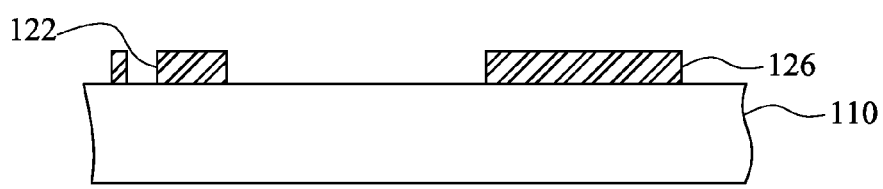
FIG. 8A is a cross-sectional view of a light-shielding conductive patterned layer according to a sixth embodiment of the present disclosure.

FIG. 8A is a cross-sectional view of a light-shielding conductive patterned layer according to the sixth embodiment of the present disclosure. A top view of the light-shielding conductive patterned layer may be the same as FIG. 1A. In particular, in the sixth embodiment, the light-shielding conductive patterned layer (not shown) is a single-layer structure. That is, the light-shielding conductive wire 122 and the first bridging electrode 126 may also be the single-layer structure, as shown in FIG. 8A. Of course, the first contact pad 124 may also be the single-layer structure. For instance, a light-shielding conductive material layer (not shown) may be formed covering the transparent substrate 110, and then patterned to form the light-shielding conductive patterned layer 120 of FIG. 1A. The light-shielding conductive patterned layer 120 may be the single-layer structure and made of a light-shielding conductive material, such as chromium or other suitable materials. The light-shielding conductive material preferably exhibits low reflectance, low transmittance and good conductive properties.

Figure 8B:
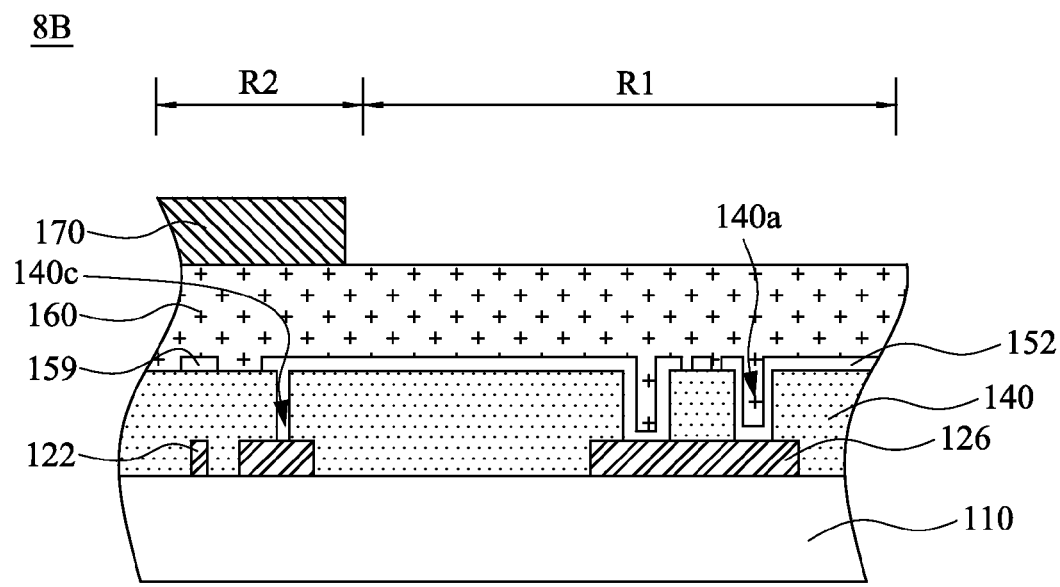
FIG. 8B is a cross-sectional view of a touch panel according to the sixth embodiment of the present disclosure.

FIG. 8B is a cross-sectional view of a touch panel 8B according to the sixth embodiment of the present disclosure. The difference between the touch panel 8B and the touch panel of FIG. 4B is that for the touch panel 8B, the light-shielding wire 122 and the first bridging electrode 126 belong to the single-layer structure; the insulating layer 140 almost fully covers the transparent substrate 110, and only contact holes and openings (e.g., the contact hole 140c and the first opening 140a) may be formed at locations in need of being electrically connected; the transparent conductive patterned layer 150 of FIG. 8B further includes a protective conductive layer 159 covering the light-shielding wire 122; the protective layer 160 further covers the insulating layer 140 on the peripheral region R2 of the transparent substrate 110; the light-shielding patterned layer 170 is disposed on the protective layer 160. Compared with the touch panel of FIG. 4B, since the insulating layer 140 of the touch panel 8B almost fully covers the transparent substrate 110, etched traces generated by etching the insulating layer 140 is not obvious. Therefore, the appearance of the touch panel 8B may be improved.

Figure 8C:
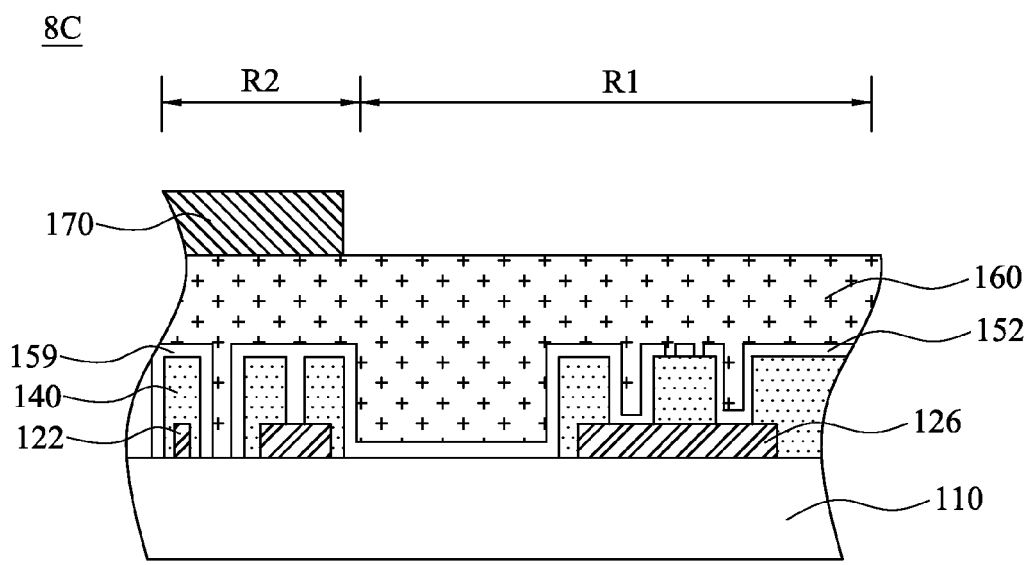
FIG. 8C is a cross-sectional view of a touch panel according to the sixth embodiment of the present disclosure.

FIG. 8C is a cross-sectional view of a touch panel 8C according to the sixth embodiment of the present disclosure. The difference between the touch panel 8C and the touch panel 8B is that for the touch panel 8C, each light-shielding wire 122 is covered by the island insulating layer 140; the transparent conductive patterned layer 150 of FIG. 8C further includes a protective conductive layer 159 covering the island insulating layer 140. The protective conductive layer 159 fully covers the light-shielding wire 122 to effectively prevent corrosion of the light-shielding wire 122 and thus to improve reliability thereof. Moreover, in the sensing region R1, the insulating layer 140 may be formed only on the first bridging electrode 126, and most of the sensing region R1 is not covered by the insulating layer 140 so as to prevent color shift caused by uneven thickness of the insulating layer 140.

Seventh Embodiment

Figure 9:
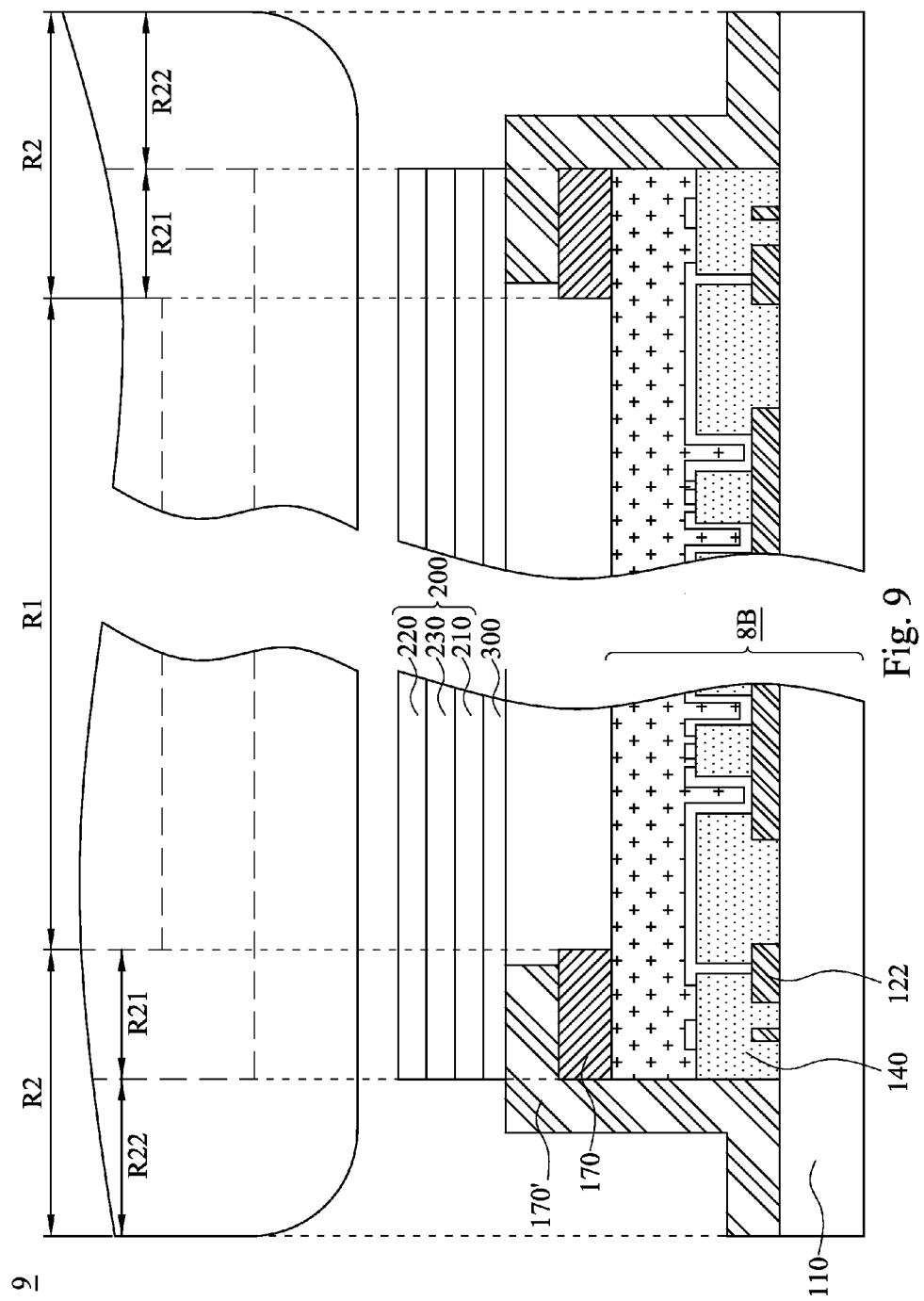
FIG. 9 is top and cross-sectional views of a touch display panel according to a seventh embodiment of the present disclosure.

FIG. 9 is top and cross-sectional views of a touch display panel 9 according to the seventh embodiment of the present disclosure. The touch display panel 9 includes a touch panel 8B, a decoration material layer 170', a display panel 200 and an adhesive layer 300. In a top view, the peripheral region R2 includes a light-shielding region R21 and an appearance region (or namely exterior region) R22. The light-shielding region R21 is disposed between the sensing region R1 and the appearance region R22 and surrounds the entire sensing region R1. The appearance region R22 is disposed at an edge of the transparent substrate 110 and surrounds the entire light-shielding region R21. The light-shielding patterned layer 170 of the touch panel 8B is disposed on the light-shielding region R21 of the transparent substrate 110 and covers the light-shielding wire 122 beneath the insulating layer 140. The decoration material layer 170' is formed on the appearance region R22 of the transparent substrate 110 and extends to the light-shielding region R21 and is disposed on the light-shielding patterned layer 170. The light-shielding patterned layer 170 may be a black resin, and the decoration material layer 170' may be a color resin. The light-shielding patterned layer 170 and the decoration material layer 170' may be formed by spraying, adhering, screen-printing or ink or photoresist coating.

Eighth Embodiment

Figure 10A:
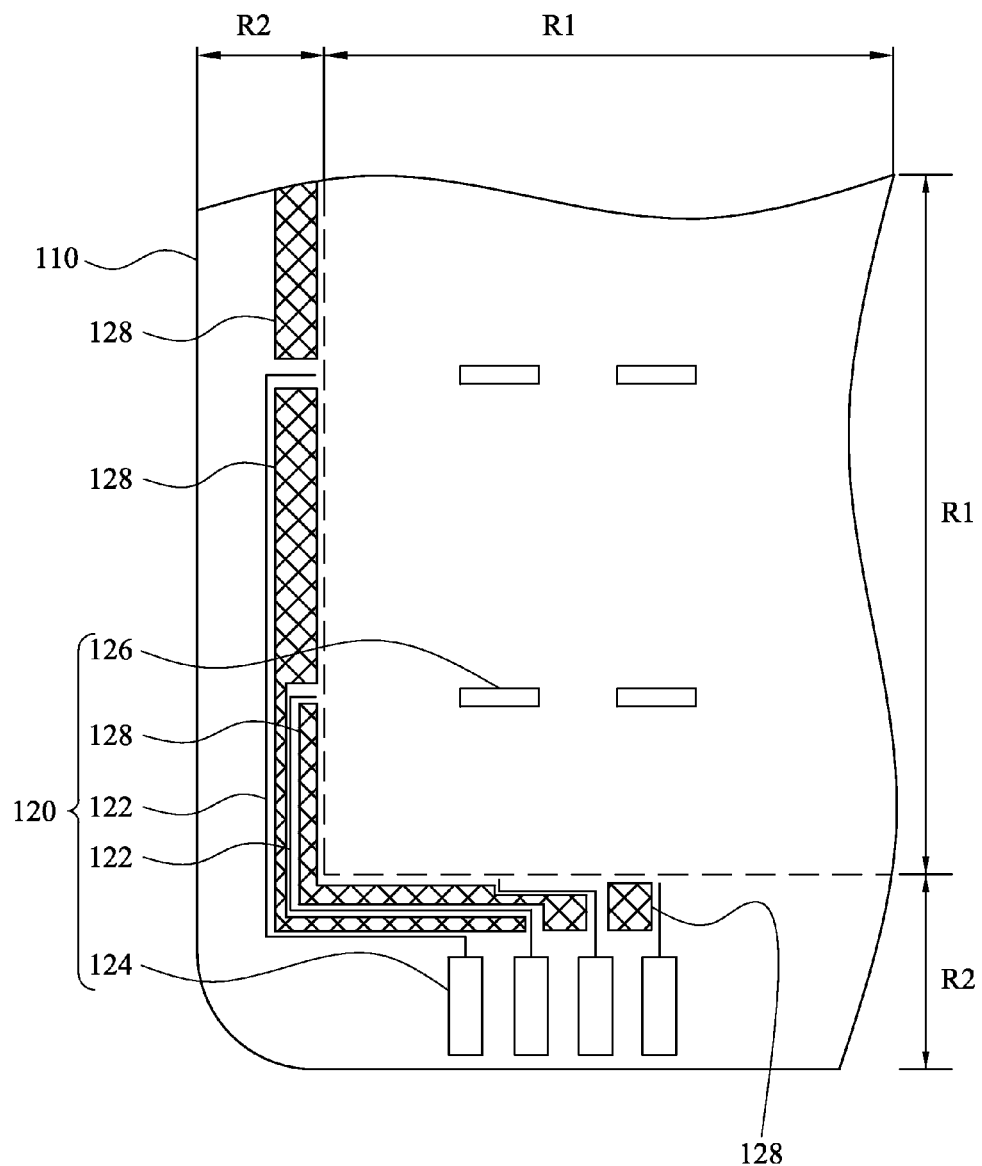
FIG. 10A is a top view of a light-shielding conductive patterned layer according to an eighth embodiment of the present disclosure.

FIG. 10A is a top view of a light-shielding conductive patterned layer 120 according to the eighth embodiment of the present disclosure. The light-shielding conductive patterned layer 120 of FIG. 10A is similar to that of FIG. 1A, and the difference therebetween is that the light-shielding conductive patterned layer 120 of FIG. 10A further includes at least one dummy light-shielding conductive pattern 128 formed on the peripheral region R2 of the transparent substrate 110 to enhance the look of the appearance.

The dummy light-shielding conductive pattern 128 is in contact with an upper surface of the transparent substrate 110. The dummy light-shielding conductive pattern 128 may be disposed between two adjacent light-shielding wires 122 or on the peripheral region R2 near the sensing region R1. Wherein, the dummy light-shielding conductive pattern 128 is not contact with any conductive pattern, for example, a light-shielding wires 122, the first and second sensing electrodes 152 and 154. In practical applications, an arrangement of the dummy light-shielding conductive pattern 128 and the light-shielding wire 122 may be appropriately altered.

Figure 10B:
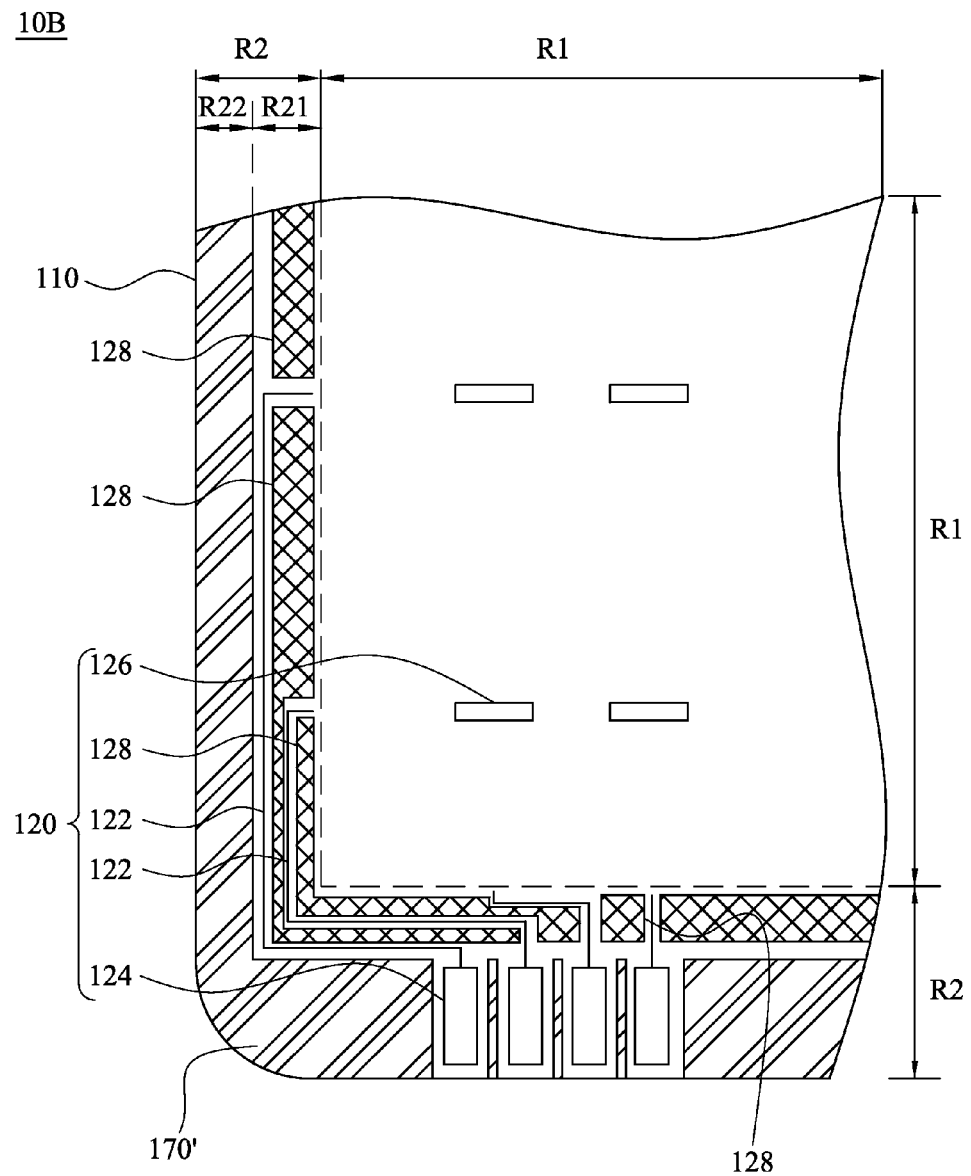
FIG. 10B is a top view of a light-shielding conductive patterned layer and a decoration material layer according to the eighth embodiment of the present disclosure.

FIG. 10B is a top view of the light-shielding conductive patterned layer 120 and a decoration material layer 170' according to the eighth embodiment of the present disclosure. The difference between FIG. 10A and FIG. 10B is that a decoration material layer 170' is disposed on the peripheral region R2 of the transparent substrate 110. Specifically, the peripheral region R2 includes a light-shielding region R21 and an appearance region R22. The dummy light-shielding conductive pattern 128 is formed on the light-shielding region R21 of the transparent substrate 110 and in contact with an upper surface of the transparent substrate 110. The decoration material layer 170' is disposed on the appearance region R22 of the transparent substrate 110 to enhance the look of the appearance.

Ninth Embodiment

Figure 11:
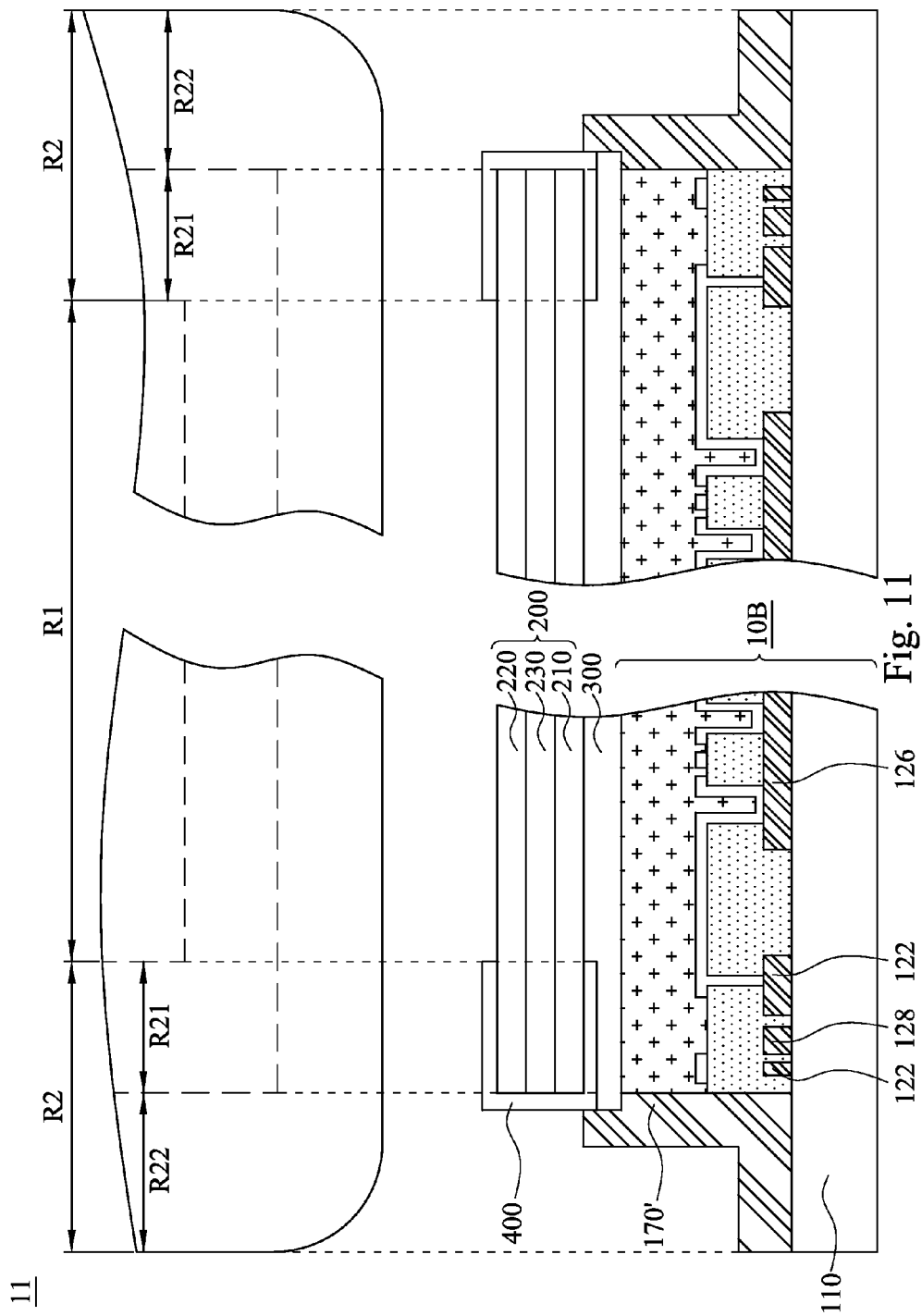
FIG. 11 is top and cross-sectional views of a touch display panel according to a ninth embodiment of the present disclosure.

FIG. 11 is top and cross-sectional views of a touch display panel 11 according to the ninth embodiment of the present disclosure. The touch display panel 11 includes a touch panel 10B, a display panel 200, an adhesive layer 300 and a light-shielding patterned frame 400. The difference between the touch display panel 11 and the touch display panel 9 is that the touch panel 10B further includes a dummy light-shielding conductive pattern 128 and the light-shielding patterned frame 400. The dummy light-shielding conductive pattern 128 is disposed on the light-shielding region R21 of the transparent substrate 110, and thus there is no need for the light-shielding patterned layer 170 of FIG. 9 disposed on the light-shielding region R21. The light-shielding patterned frame 400 may be a black adhesive tape, which can be adhered on a region of the display panel 200 aligned with the light-shielding region R21 of the touch panel 10B, and thus to further avoid light leakage at the light-shielding region R21.

Tenth Embodiment

FIGS. 12, 13A, 14, 15 and 16A are top views at various stages of manufacturing a touch panel according to the tenth embodiment of the present disclosure.

Figure 12:
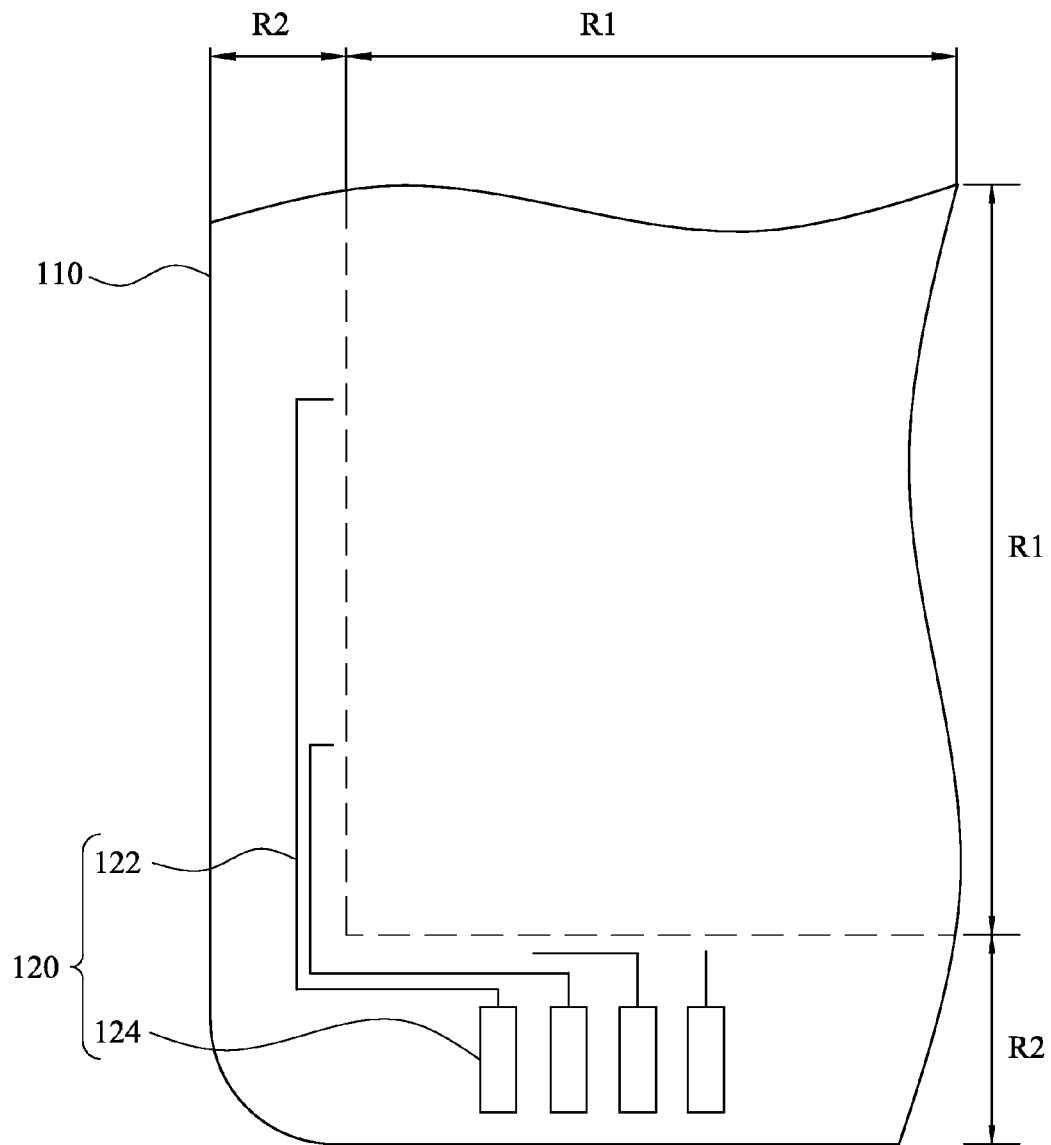
FIGS. 12, 13A, 14, 15 and 16A are top views at various stages of manufacturing a touch panel according to a tenth embodiment of the present disclosure.

A transparent substrate 110 is provided, as shown in FIG. 12, and the specific embodiments thereof may be referred to the first embodiment. Next, a light-shielding conductive patterned layer 120 is formed on the peripheral region R2 of the transparent substrate 110. The light-shielding conductive patterned layer 120 includes a light-shielding wire 122 and a first contact pad 124. Specifically, the light-shielding wire 122 and the first contact pad 124 are formed by a same process, and the light-shielding wire 122 is connected to the first contact pad 124. The features of the light-shielding wire 122 and the first contact pad 124 may be the same as those of the first embodiment. Methods for manufacturing the light-shielding conductive patterned layer 120 may be the same as those of the first embodiment, and thus are omitted herein.

Figure 13A:
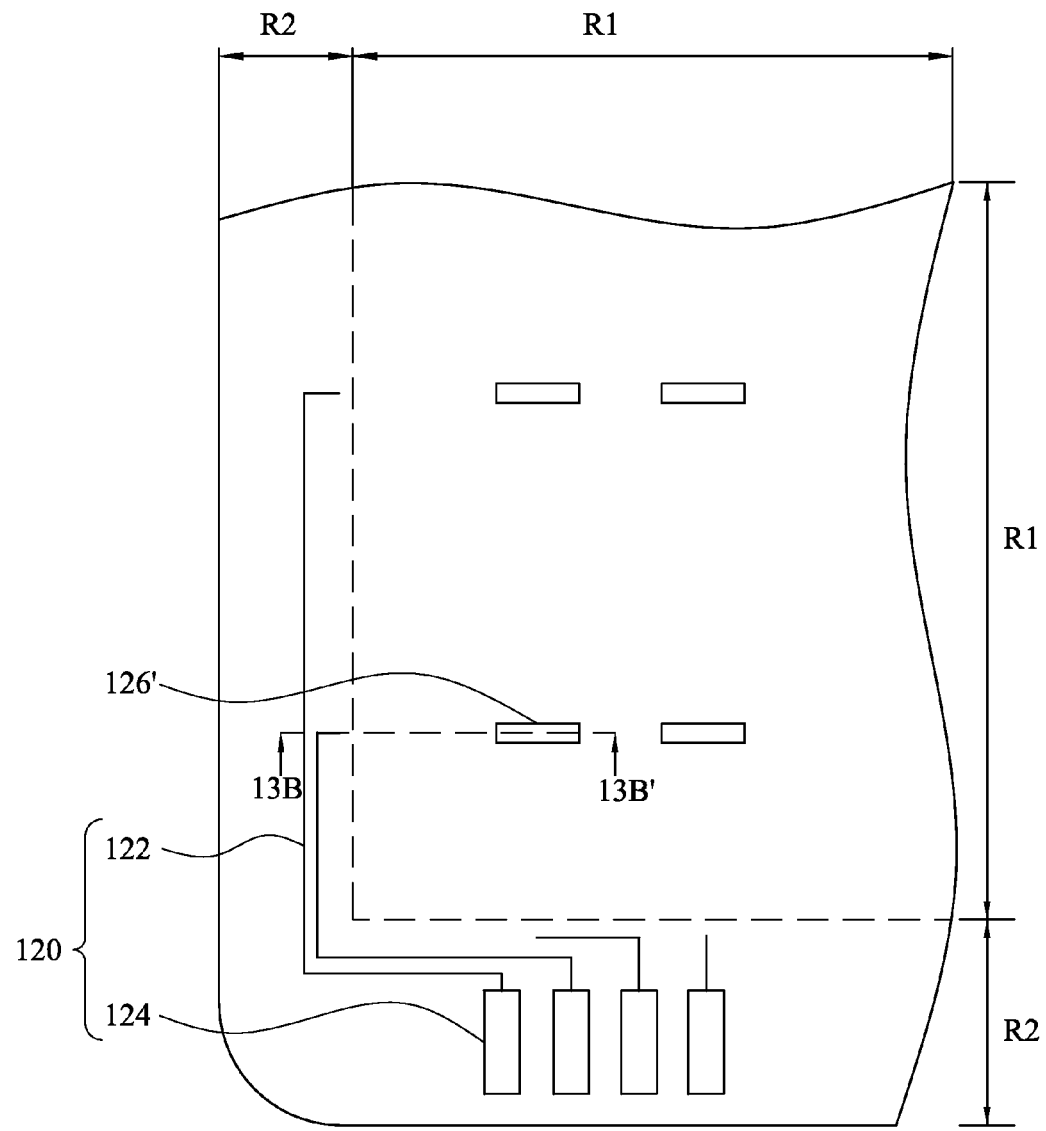
Figure 13B:
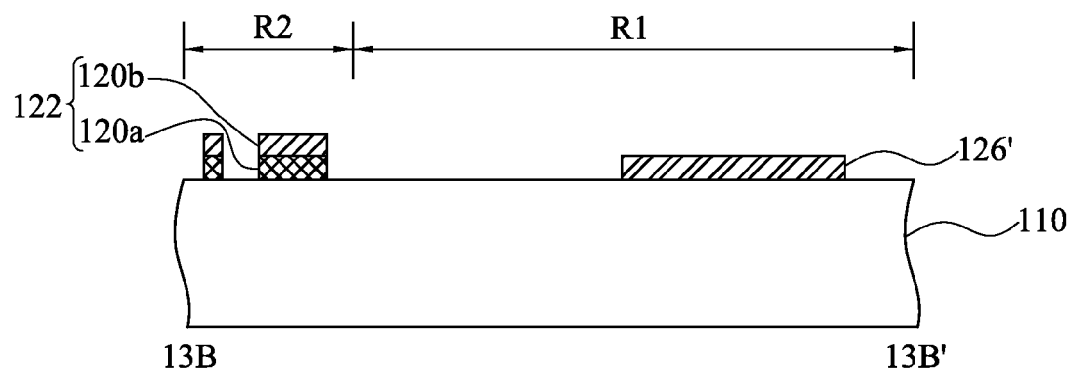
FIG. 13B is a cross-sectional view along line 13B-13B' of FIG. 13A.

At least one first bridging electrode 126' is formed on the sensing region R1 of the transparent substrate 110, as shown in FIG. 13A. The first bridging electrode 126' may be a single-layer or multi-layer structure. FIG. 13B is a cross-sectional view of FIG. 13A along line 13B-13B' of FIG. 13A. As shown in FIG. 13B, in the eighth embodiment, the first bridging electrode 126' is a single-layer structure, and the light-shielding wire 122 is a double-layer structure, but not limited thereto. The first bridging electrode 126' may include a transparent conductive material or metal. The transparent conductive material may be indium tin oxide (ITO), indium zinc oxide (IZO), hafnium oxide (HfOx), zinc oxide (ZnOx), aluminum zinc oxide (AZO), aluminum tin oxide (ATO), indium gallium zinc oxide (IGZO), gallium zinc oxide (GZO), indium titanium oxide (ITiO), indium molybdenum oxide (IMO) or other suitable materials. The metal may be referred to those exemplified for the first embodiment.

Figure 14:
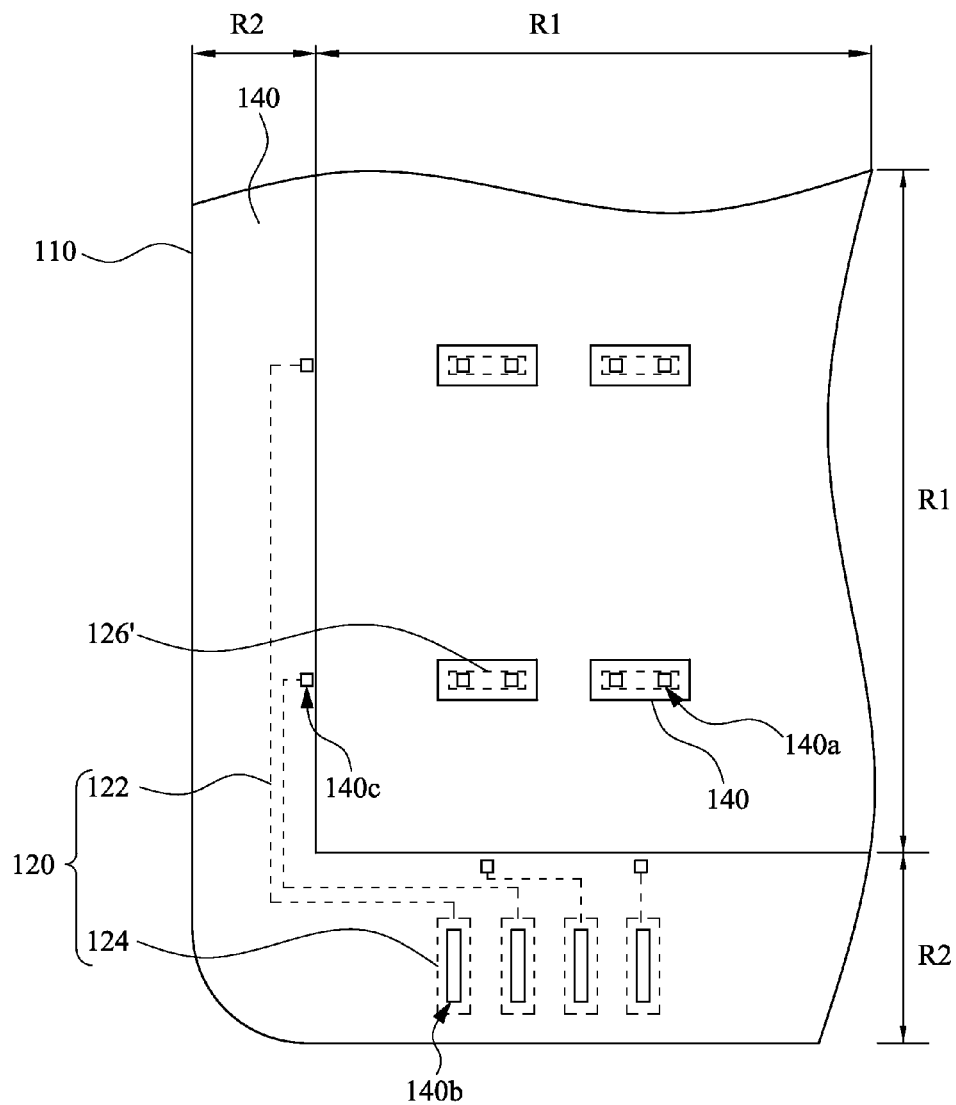

An insulating layer 140 is formed on a portion of the first bridging electrode 126, a portion of the first contact pad 124 and a portion of the transparent substrate 110, as shown in FIG. 14. The specific embodiments may be referred to the first embodiment. Subsequently, a first opening 140a and a second opening 140b are formed in the insulating layer 140 to respectively expose a portion of the first bridging electrode 126' and a portion of the first contact pad 124, as shown in FIG. 14. The specific embodiments may be referred to the first embodiment.

Figure 15:
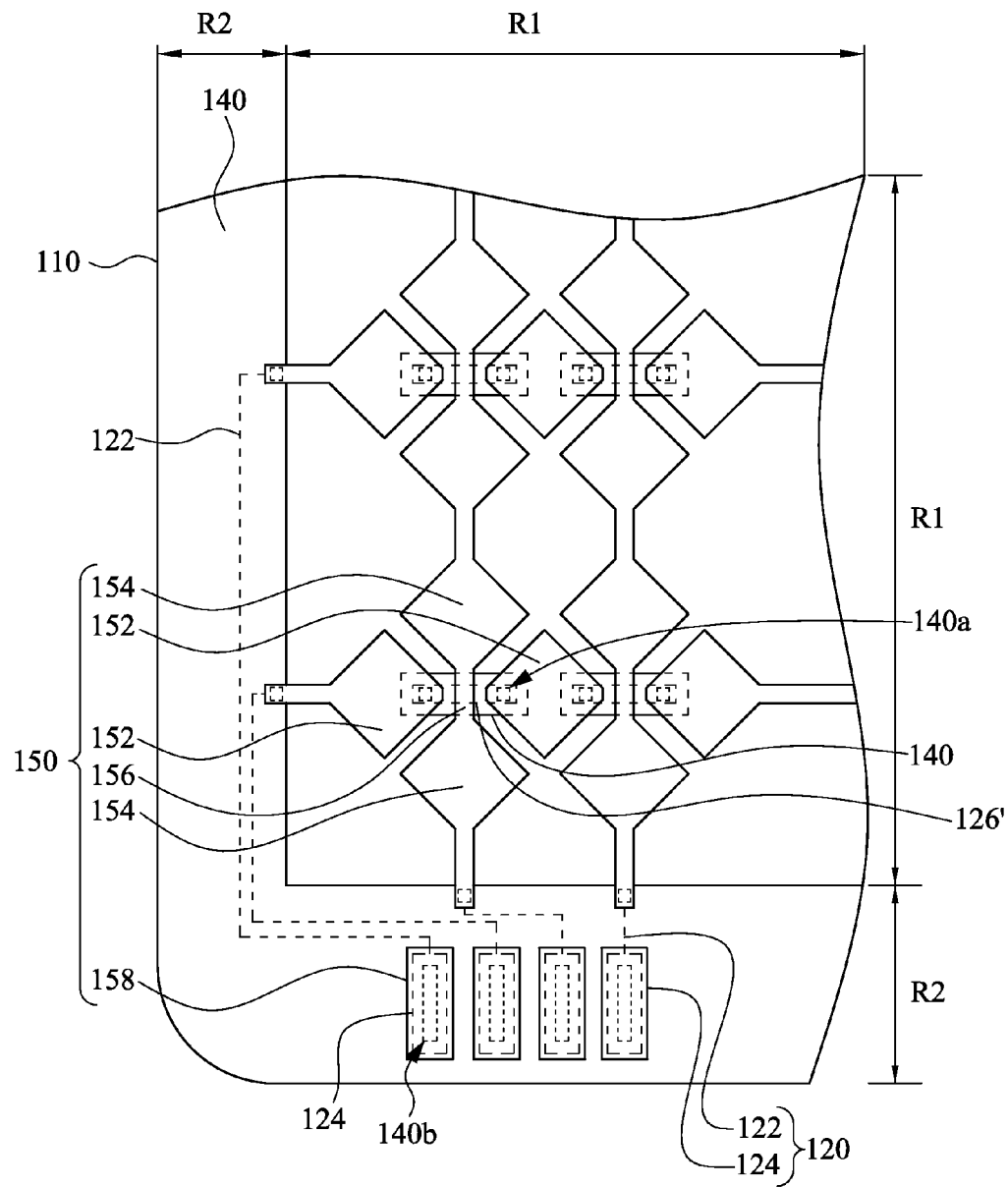

A transparent conductive patterned layer 150 is formed on the transparent substrate 110, as shown in FIG. 15. The transparent conductive patterned layer 150 includes at least two first sensing electrodes 152, at least two second sensing electrodes 154, at least one second bridging electrode 156 and at least one second contact pad 158. The specific embodiments may be referred to the first embodiment.

Figure 16A:
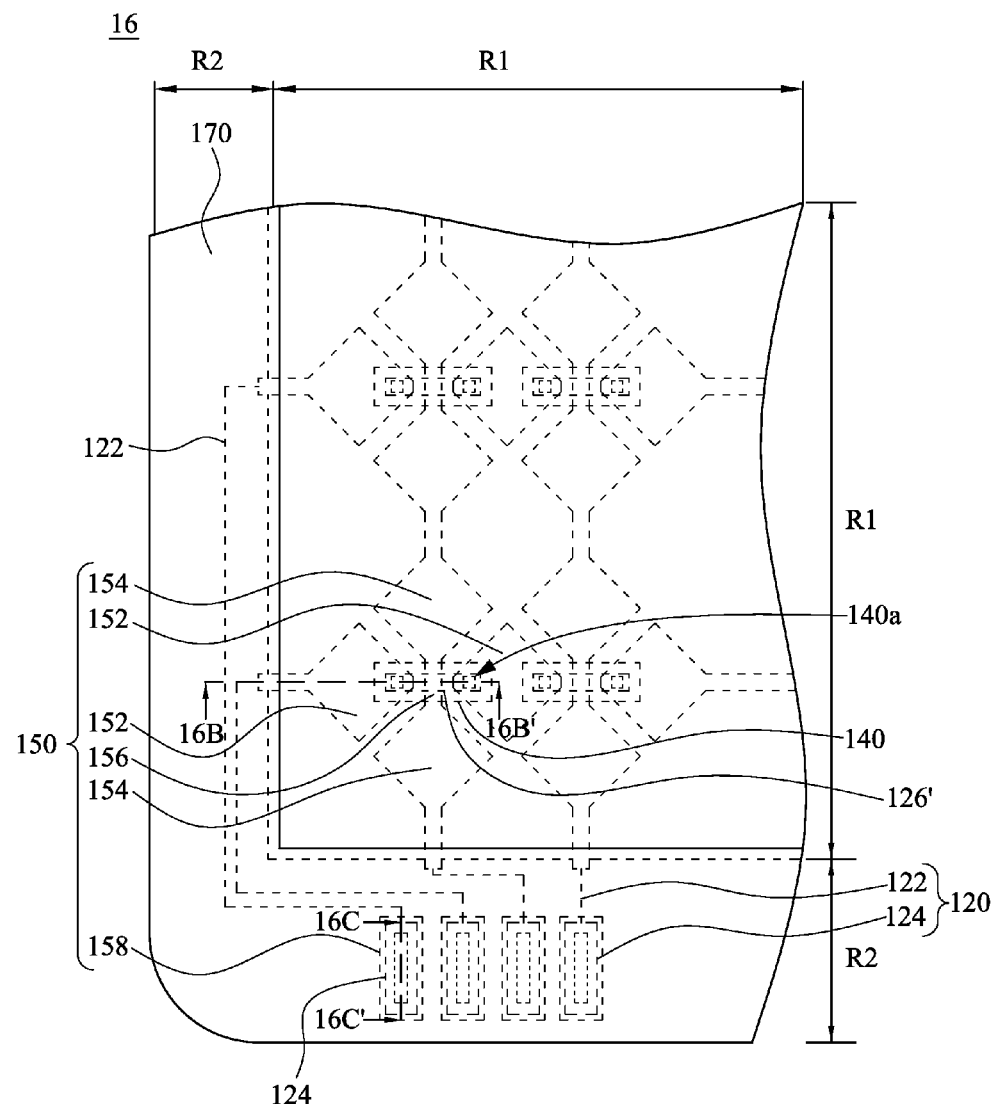
Figure 16B:
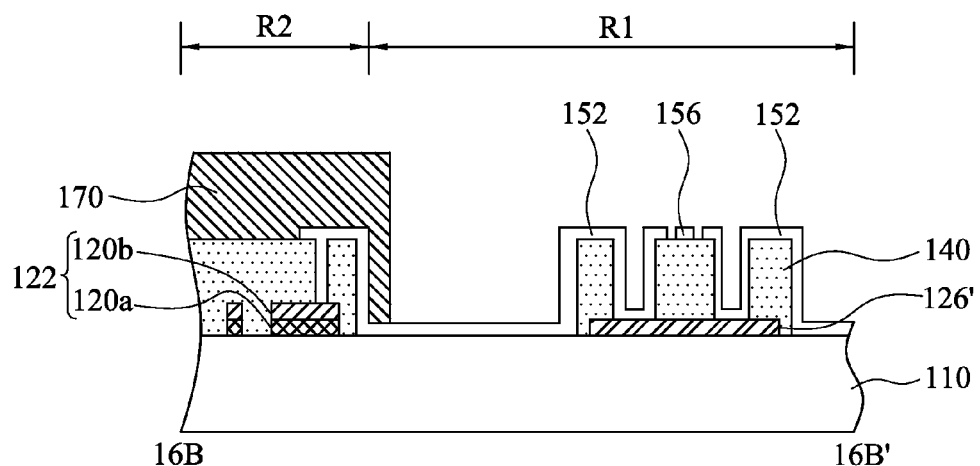
FIG. 16B is a cross-sectional view along line 16B-16B' of FIG. 16A.
Figure 16C:
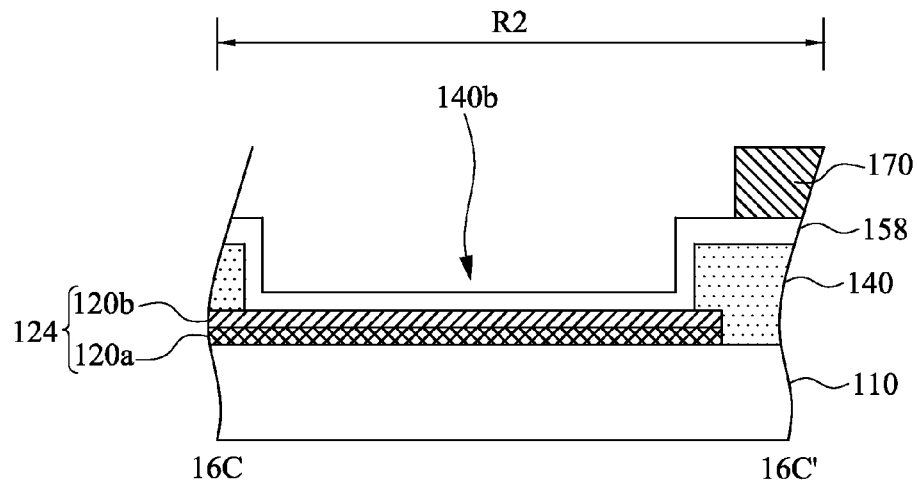
FIG. 16C is a cross-sectional view along line 16C-16C' of FIG. 16A.

A light-shielding patterned layer 170 is formed on the light-shielding conductive patterned layer 120 of the peripheral region R2, as shown in FIG. 16A. FIG. 16B is a cross-sectional view along line 16B-16B' of FIG. 16A. FIG. 16C is a cross-sectional view along line 16C-16C' of FIG.

16A. As shown in FIGS. 16B-16C, the light-shielding patterned layer 170 covers the light-shielding wire 122, the first contact pad 124 and the second contact pad 158. The specific features of the light-shielding patterned layer 170 may be the same as those of the light-shielding patterned layer 170 (shown in FIG. 6A) of the fourth embodiment.

As mentioned above, it requires only four photolithographic masking and etching processes to form the touch panel 16 of FIG. 16A according to the tenth embodiment of the present disclosure. The light-shielding conductive patterned layer 120 is formed through the first photolithographic masking and etching processes, as shown in FIG. 12. The light-shielding conductive patterned layer 120 includes a light-shielding wire 122 and the first contact pad 124. The first bridging electrode 126' is formed through the second photolithographic masking and etching processes, as shown in FIG. 13A. The insulating layer 140 having the first opening 140a and the second opening 140b is formed through the third photolithographic masking and etching processes, as shown in FIG. 14. The transparent conductive patterned layer 150 is formed through the fourth photolithographic masking and etching processes, as shown in FIG. 15. Therefore, cost of the manufacturing method is low, which is conductive to enhance production efficiency.

Another aspect of the present disclosure provides a touch panel. According to the first embodiment, as shown in FIGS. 3A-3C, the touch panel 3 includes a transparent substrate 110, a light-shielding conductive patterned layer 120, an insulating layer 140 and a transparent conductive patterned layer 150.

The transparent substrate 110 has a sensing region R1 and a peripheral region R2 surrounding the sensing region R1. The light-shielding conductive patterned layer 120 is disposed on the transparent substrate 110. The light-shielding conductive patterned layer 120 includes at least one light-shielding wire 122, at least one first contact pad 124 and at least one first bridging electrode 126. The light-shielding wire 122 and the first contact pad 124 are disposed on the peripheral region R2 of the transparent substrate 110, and the light-shielding wire 122 is connected to the first contact pad 124. The first bridging electrode 126 is disposed on the sensing region R1 of the transparent substrate 110.

The insulating layer 140 is disposed on a portion of the first bridging electrode 126, a portion of the first contact pad 124 and a portion of the transparent substrate 110. The insulating layer 140 has at least one first opening 140a on the first bridging electrode 126 and at least one second opening 140b on the first contact pad 124.

The transparent conductive patterned layer 150 is disposed on the transparent substrate 110. The transparent conductive patterned layer 150 includes at least two first sensing electrodes 152, at least two second sensing electrodes 154, at least one second bridging electrode 156 and at least one second contact pad 158. Each of the first sensing electrodes 152 is disposed on the sensing region R1 of a portion of the transparent substrate 110 and a portion of the insulating layer 140. Each of the second sensing electrodes 154 is disposed on the sensing region R1 of a portion of the transparent substrate 110. The second contact pad 158 is disposed on the insulating layer 140 on the peripheral region R2. Each of the first sensing electrodes 152 is connected to the first bridging electrode 126 through the first opening 140a. The second sensing electrodes 154 are connected to each other through the second bridging electrode 156. The second contact pad 158 is connected to the first contact pad 124 through the second opening 140b.

In the tenth embodiment, as shown in FIGS. 16A-16C, the touch panel 16 includes a transparent substrate 110, a light-shielding conductive patterned layer 120, at least one first bridging electrode 126', an insulating layer 140, a transparent conductive patterned layer 150, at least two second sensing electrodes 154, at least one second bridging electrode 156, at least one second contact pad 158 and a light-shielding patterned layer 170.

The transparent substrate 110 has a sensing region R1 and a peripheral region R2 surrounding the sensing region R1. The light-shielding conductive patterned layer 120 is disposed on the peripheral region R2 of the transparent substrate 110. The light-shielding conductive patterned layer 120 includes a light-shielding wire 122 and a first contact pad 124, and the light-shielding wire 122 is connected to the first contact pad 124. The first bridging electrode 126' is disposed on the sensing region R1 of the transparent substrate 110.

The insulating layer 140 is disposed on a portion of the first bridging electrode 126', a portion of the first contact pad 124 and a portion of the transparent substrate 110. The insulating layer 140 has a first opening 140a on the first bridging electrode 126' and a second opening 140b on the first contact pad 124.

The transparent conductive patterned layer 150 is disposed on the transparent substrate 110 and includes at least two first sensing electrodes 152. Each of the first sensing electrodes 152 is disposed on the sensing region R1 of a portion of the transparent substrate 110 and a portion of the insulating layer 140.

Each of the second sensing electrodes 154 is disposed on the sensing region R1 of a portion of the transparent substrate 110. The second contact pad 158 is disposed on the insulating layer 140 on the peripheral region R2. Each of the first sensing electrodes 152 is connected to the first bridging electrode 126' through the first opening 140a. The second sensing electrodes 154 are connected to each other through the second bridging electrode 156. The second contact pad 158 is connected to the first contact pad 124 through the second opening 140b. The light-shielding patterned layer 170 is disposed on the light-shielding conductive patterned layer 120 on the peripheral region R2.

As mentioned above, the light-shielding conductive patterned layer is formed on the transparent substrate according to the embodiments of the present disclosure, such that there is no need for a black resin layer (or called as a black matrix) disposed on the peripheral region of the transparent substrate by an additional photolithographic masking and etching processes. Further, the protective layer and the light-shielding patterned layer may not be formed by photolithographic masking and etching processes. Therefore, the embodiments of the present disclosure requires only three or four photolithographic masking and etching processes to form the touch panel so as to reduce manufacturing cost and increase production efficiency.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for manufacturing a touch panel, comprising:
providing a transparent substrate, which has a sensing region and a peripheral region surrounding the sensing region;
forming a light-shielding conductive patterned layer on the transparent substrate, comprising:
    forming at least one light-shielding wire and at least one first contact pad on the peripheral region of the transparent substrate, and the light-shielding wire is connected to the first contact pad; and
    forming at least one first bridging electrode on the sensing region of the transparent substrate;
forming an insulating layer on a portion of the first bridging electrode, a portion of the first contact pad and a portion of the transparent substrate;
forming at least one first opening and at least one second opening in the insulating layer to respectively expose a portion of the first bridging electrode and a portion of the first contact pad;
forming a transparent conductive patterned layer on the transparent substrate, comprising:
    forming at least two first sensing electrodes on the sensing region of a portion of the transparent substrate and a portion of the insulating layer;
    forming at least two second sensing electrodes on the sensing region of a portion of the transparent substrate;
    forming at least one second bridging electrode on the sensing region of the transparent substrate; and
    forming at least one second contact pad on the insulating layer on the peripheral region,
wherein each of the first sensing electrodes is connected to the first bridging electrode through the first opening, and the second sensing electrodes are connected to each other through the second bridging electrode, and the second contact pad is connected to the first contact pad through the second opening.

2. The method of claim 1, wherein forming the light-shielding conductive patterned layer comprises:
sequentially forming a light-shielding material layer and a conductive material layer covering the transparent substrate; and
patterning the conductive material layer and the light-shielding material layer to form the light-shielding conductive patterned layer.

3. The method of claim 2, wherein patterning the conductive material layer and the light-shielding material layer comprises:
forming a patterned photoresist layer on the conductive material layer to expose a portion of the conductive material layer;
removing the portion of the conductive material layer, which is not covered by the patterned photoresist layer, to expose a portion of the light-shielding material layer; and
removing the exposed portion of the light-shielding material layer; and
removing the patterned photoresist layer.

4. The method of claim 1, wherein forming the light-shielding conductive patterned layer comprises:
forming a light-shielding conductive material layer covering the transparent substrate; and
patterning the light-shielding conductive material layer to form the light-shielding conductive patterned layer.

5. The method of claim 1, wherein forming the light-shielding conductive patterned layer further comprises forming at least one dummy light-shielding conductive pattern on the peripheral region of the transparent substrate, and the dummy light-shielding conductive pattern is in contact with an upper surface of the transparent substrate.

6. The method of claim 1, further comprising forming a light-shielding patterned layer covering the first contact pad, the second contact pad and the light-shielding wire on the peripheral region.

7. The method of claim 1, further comprising forming a protective layer covering the transparent conductive patterned layer on the sensing region.

8. The method of claim 7, wherein the protective layer further covers the insulating layer on the peripheral region.

9. The method of claim 1, wherein forming the transparent conductive patterned layer further comprises forming a protective conductive layer covering the light-shielding wire.

10. The method of claim 1, further comprising forming a decoration material layer, and the peripheral region has a light-shielding region and an appearance region, and the light-shielding region is between the sensing region and the appearance region and surrounds the sensing region, and the appearance region surrounds the light-shielding region, and the decoration material layer is formed on the appearance region of the transparent substrate.

11. The method of claim 10, wherein forming the light-shielding conductive patterned layer further comprises forming at least one dummy light-shielding conductive pattern on the light-shielding region of the transparent substrate, and the dummy light-shielding conductive pattern is in contact with an upper surface of the transparent substrate.

12. The method of claim 10, further comprising forming a light-shielding patterned layer on the light-shielding region of the transparent substrate to cover the light-shielding wire beneath the insulating layer.

13. A method for manufacturing a touch panel, comprising:
providing a transparent substrate, which has a sensing region and a peripheral region surrounding the sensing region;
forming a light-shielding conductive patterned layer on the peripheral region of the transparent substrate, and the light-shielding conductive patterned layer comprises a light-shielding wire and a first contact pad, and the light-shielding wire is connected to the first contact pad;
forming at least one first bridging electrode on the sensing region of the transparent substrate;
forming an insulating layer on a portion of the first bridging electrode, a portion of the first contact pad and a portion of the transparent substrate;
forming at least one first opening and at least one second opening in the insulating layer to respectively expose a portion of the first bridging electrode and a portion of the first contact pad;
forming a transparent conductive patterned layer on the transparent substrate, comprising:
    forming at least two first sensing electrodes on the sensing region of a portion of the transparent substrate and a portion of the insulating layer;
    forming at least two second sensing electrodes on the sensing region of a portion of the transparent substrate;
    forming at least one second bridging electrode on the sensing region of the transparent substrate; and forming at least one second contact pad on the insulating layer on the peripheral region,
wherein each of the first sensing electrodes is connected to the first bridging electrode through the first opening, and the second sensing electrodes are connected to each other through the second bridging electrode, and the second contact pad is connected to the first contact pad through the second opening; and
forming a light-shielding patterned layer on the light-shielding conductive patterned layer on the peripheral region.

14. A touch panel, comprising:
a transparent substrate having a sensing region and a peripheral region surrounding the sensing region;
a light-shielding conductive patterned layer disposed on the transparent substrate, wherein the light-shielding conductive patterned layer comprises:
at least one light-shielding wire and at least one first contact pad disposed on the peripheral region of the transparent substrate, and the light-shielding wire is connected to the first contact pad; and
at least one first bridging electrode disposed on the sensing region of the transparent substrate;
an insulating layer disposed on a portion of the first bridging electrode, a portion of the first contact pad and a portion of the transparent substrate, wherein the insulating layer has at least one first opening on the first bridging electrode and at least one second opening on the first contact pad;
a transparent conductive patterned layer disposed on the transparent substrate, and the transparent conductive patterned layer comprises:
at least two first sensing electrodes, each of the first sensing electrodes disposed on the sensing region of a portion of the transparent substrate and a portion of the insulating layer;
at least two second sensing electrodes, each of the second sensing electrodes disposed on the sensing region of a portion of the transparent substrate; and
at least one second bridging electrode and at least one second contact pad, and the second contact pad is disposed on the insulating layer on the peripheral region; wherein each of the first sensing electrodes is connected to the first bridging electrode through the first opening, and the second sensing electrodes are connected to each other through the second bridging electrode, and the second contact pad is connected to the first contact pad through the second opening.

15. The touch panel of claim 14, wherein each of the first sensing electrodes is not in contact with each of the second sensing electrodes.

16. The touch panel of claim 14, wherein the second bridging electrode crosses the first bridging electrode.

17. The touch panel of claim 14, wherein the light-shielding conductive patterned layer comprises a light-shielding material layer and a conductive material layer, and the light-shielding material layer is sandwiched between the conductive material layer and the transparent substrate, and vertical projections of the light-shielding material layer and the conductive material layer on the transparent substrate overlap with each other, and the conductive material layer includes metal.

18. The touch panel of claim 14, further comprising a protective layer covering the transparent conductive patterned layer on the sensing region.

19. The touch panel of claim 18, wherein the protective layer further covers the insulating layer on the peripheral region.

20. The touch panel of claim 14, further comprising a light-shielding patterned layer covering on the first contact pad, the second contact pad and the light-shielding wire on the peripheral region.

21. The touch panel of claim 14, wherein the at least one light-shielding wire, the at least one first contact pad and the at least one first bridging electrode of the light-shielding conductive patterned layer are in contact with the transparent substrate.

22. The touch panel of claim 20, wherein the light-shielding patterned layer further extends and covers a portion of the sensing region of the transparent substrate to expose other portions of the sensing region.

23. The touch panel of claim 14, wherein the transparent conductive patterned layer further comprises a protective conductive layer covering on the light-shielding wire.

24. The touch panel of claim 14, further comprising a decoration material layer, and the peripheral region has a light-shielding region and an appearance region, and the light-shielding region is between the sensing region and the appearance region and surrounds the sensing region, and the appearance region surrounds the light-shielding region, and the decoration material layer is disposed on the appearance region of the transparent substrate and on the insulating layer.

25. The touch panel of claim 24, wherein the light-shielding conductive patterned layer further comprises at least one dummy light-shielding conductive pattern disposed on the light-shielding region of the transparent substrate, and the dummy light-shielding conductive pattern is in contact with an upper surface of the transparent substrate.

26. The touch panel of claim 24, further comprising a light-shielding patterned layer disposed on the light-shielding region of the transparent substrate and on the insulating layer to cover the light-shielding wire beneath the insulating layer.

27. The touch panel of claim 20, wherein the light-shielding patterned layer is disposed on the insulating layer.

28. A touch panel, comprising:
a transparent substrate having a sensing region and a peripheral region surrounding the sensing region;
a light-shielding conductive patterned layer disposed on the peripheral region of the transparent substrate, wherein the light-shielding conductive patterned layer comprises a light-shielding wire and a first contact pad, and the light-shielding wire is connected to the first contact pad;
at least one first bridging electrode disposed on the sensing region of the transparent substrate;
an insulating layer disposed on a portion of the first bridging electrode, a portion of the first contact pad and a portion of the transparent substrate, wherein the insulating layer has a first opening on the first bridging electrode and a second opening on the first contact pad;
a transparent conductive patterned layer disposed on the transparent substrate, and the transparent conductive patterned layer comprises at least two first sensing electrodes, each of the first sensing electrodes disposed on the sensing region of a portion of the transparent substrate and a portion of the insulating layer;
at least two second sensing electrodes, each of the second sensing electrodes disposed on the sensing region of a portion of the transparent substrate;

at least one second bridging electrode and at least one second contact pad, the second contact pad disposed on the insulating layer on the peripheral region;

wherein each of the first sensing electrodes is connected to the first bridging electrode through the first opening, and the second sensing electrodes are connected to each other through the second bridging electrode, and the second contact pad is connected to the first contact pad through the second opening; and a light-shielding patterned layer disposed on the light-shielding conductive patterned layer on the peripheral region, and the second contact pad between the first contact pad and the light-shielding patterned layer, and vertical projections of the second contact pad, the first contact pad and the light-shielding patterned layer on substrate overlap with each other.

29. The touch panel of claim 28, wherein each of the first sensing electrodes is not in contact with each of the second sensing electrodes.

30. The touch panel of claim 28, wherein the second bridging electrode crosses the first bridging electrode.

31. The touch panel of claim 28, wherein the light-shielding conductive patterned layer comprises a light-shielding material layer and a conductive material layer, and the light-shielding material layer is sandwiched between the conductive material layer and the transparent substrate, and vertical projections of the light-shielding material layer and the conductive material layer on the transparent substrate overlap with each other, and the conductive material layer includes metal.

32. The touch panel of claim 28, further comprising a protective layer covering the transparent conductive patterned layer on the sensing region.

33. The touch panel of claim 32, wherein the protective layer further covers the insulating layer on the peripheral region.

34. The touch panel of claim 28, wherein the light-shielding wire and the first contact pad of the light-shielding conductive patterned layer and the first bridging electrode are in contact with the transparent substrate.

35. The touch panel of claim 28, wherein the light-shielding patterned layer further extends and covers a portion of the sensing region of the transparent substrate to expose other portions of the sensing region.

36. The touch panel of claim 28, wherein the transparent conductive patterned layer further comprises a protective conductive layer covering on the light-shielding wire.

37. The touch panel of claim 28, further comprising a decoration material layer, and the peripheral region has a light-shielding region and an appearance region, and the light-shielding region is between the sensing region and the appearance region and surrounds the sensing region, and the appearance region surrounds the light-shielding region, and the decoration material layer is disposed on the appearance region of the transparent substrate and on the insulating layer.

38. The touch panel of claim 37, wherein the light-shielding conductive patterned layer further comprises at least one dummy light-shielding conductive pattern disposed on the light-shielding region of the transparent substrate, and the dummy light-shielding conductive pattern is in contact with an upper surface of the transparent substrate.

39. The touch panel of claim 37, wherein the light-shielding patterned layer is disposed on the light-shielding region of the transparent substrate and on the insulating layer to cover the light-shielding wire beneath the insulating layer.

40. The touch panel of claim 34, wherein the light-shielding patterned layer is disposed on the insulating layer.

* * * * *